(12) United States Patent
Kuo et al.

(10) Patent No.: US 12,122,590 B2
(45) Date of Patent: Oct. 22, 2024

(54) CARRIER USED FOR PREPARING BEVERAGE AND METHOD FOR FABRICATION OF THE SAME

(71) Applicant: Golden Arrow Printing Technology (Kunshan) Co., LTD., Suzhou (CN)

(72) Inventors: Chien-Kuan Kuo, New Taipei (TW); Chun-Huang Huang, New Taipei (TW)

(73) Assignee: GOLDEN ARROW PRINTING TECHNOLOGY (KUNSHAN) CO., LTD., Suzhou (CN)

( * ) Notice: Subject to any disclaimer, the term of this patent is extended or adjusted under 35 U.S.C. 154(b) by 884 days.

(21) Appl. No.: 17/278,315

(22) PCT Filed: Sep. 26, 2018

(86) PCT No.: PCT/CN2018/107593
§ 371 (c)(1),
(2) Date: Mar. 21, 2021

(87) PCT Pub. No.: WO2020/061807
PCT Pub. Date: Apr. 2, 2020

(65) Prior Publication Data
US 2022/0033173 A1  Feb. 3, 2022

(51) Int. Cl.
*B65D 85/816* (2006.01)
*B65D 21/02* (2006.01)
*D21J 3/00* (2006.01)

(52) U.S. Cl.
CPC ....... *B65D 85/816* (2013.01); *B65D 21/0233* (2013.01); *D21J 3/00* (2013.01)

(58) Field of Classification Search
CPC ........... B65D 21/0233; B65D 81/2076; B65D 81/3874; B65D 77/20; B65D 77/2024;
(Continued)

(56) References Cited

U.S. PATENT DOCUMENTS

| 5,325,765 A | 7/1994 | Sylvan et al. |
| 5,840,189 A | 11/1998 | Sylvan et al. |

(Continued)

FOREIGN PATENT DOCUMENTS

| CN | 1070973 A | 4/1993 |
| CN | 103079970 A | 5/2013 |

(Continued)

*Primary Examiner* — Hung D Nguyen
(74) *Attorney, Agent, or Firm* — Cheng-Ju Chiang

(57) ABSTRACT

The present invention discloses a carrier used for preparing beverage and a method for fabrication thereof. The carrier has primarily components comprising a sealing lid, a filter and a paper-made container, wherein by mold assembly of wet-fiber paper-molding process, solid geometric shape of the paper-made container is integrally formed, and by demolding of the paper-made container along a demolding direction corresponding to the mold assembly, annular cup wall of the paper-made container is laterally formed with at least one protrusive portion, having central axis paralleling with the demolding direction, and after a number of the paper-made containers are one-by-one nested in alignment into a stack assembly, the at least one protrusive portion acts on ensuring the respective paper-made container is one-by-one drawn from the number of paper-made containers of the stack assembly while passing through picking of component-assembling production line, thereby assembling corresponding components to constitute the respective corresponding carrier.

27 Claims, 10 Drawing Sheets

(58) Field of Classification Search
CPC .. B65D 77/24; B65D 85/804; B65D 85/8043;
B65D 85/8046; B65D 85/8049; B65D
85/8052; B65D 85/8055; B65D 85/8058;
B65D 85/8061; B65D 85/816; B65B
29/02; B65B 29/022; B65B 29/06; A47J
31/06; A47J 31/0605; A47J 31/0642;
A47J 31/0652; A47J 31/0673; A47J
31/0689; A47J 31/34; A47J 31/3623;
A47J 31/3628; A47J 31/3633; A47J
31/3676; A47J 31/368; A47J 31/3695;
A47J 31/407; A47J 31/42; A47J 31/44;
A47J 31/4403; A47J 31/4492; A47J 31/46
See application file for complete search history.

(56) References Cited

U.S. PATENT DOCUMENTS

| | | | |
|---|---|---|---|
| 6,607,762 | B2 | 8/2003 | Lazaris et al. |
| 7,398,726 | B2 | 7/2008 | Streeter |
| 9,750,370 | B2 | 9/2017 | Beaulieu et al. |
| 2002/0012759 | A1* | 1/2002 | Asayama ............... D21H 27/38 428/34.2 |
| 2013/0136828 | A1 | 5/2013 | Anghileri |
| 2017/0107034 | A1 | 4/2017 | Okamoto |
| 2017/0233140 | A1* | 8/2017 | McMunn ............... B65D 25/14 220/228 |
| 2017/0305653 | A1* | 10/2017 | Norton ............... B65D 85/8061 |
| 2017/0355515 | A1* | 12/2017 | Marcinkowski ...... A47J 31/407 |
| 2017/0360242 | A1* | 12/2017 | Boggavarapu ........ A47J 31/407 |
| 2020/0063373 | A1* | 2/2020 | Parker ...................... D21J 1/08 |

FOREIGN PATENT DOCUMENTS

| | | |
|---|---|---|
| CN | 204310261 U | 5/2015 |
| CN | 106028885 A | 10/2016 |
| CN | 107074440 A | 8/2017 |
| CN | 107304536 A | 10/2017 |
| CN | 108290681 A | 7/2018 |
| CN | 208293308 U | 12/2018 |
| WO | 2011/031294 A2 | 3/2011 |

* cited by examiner

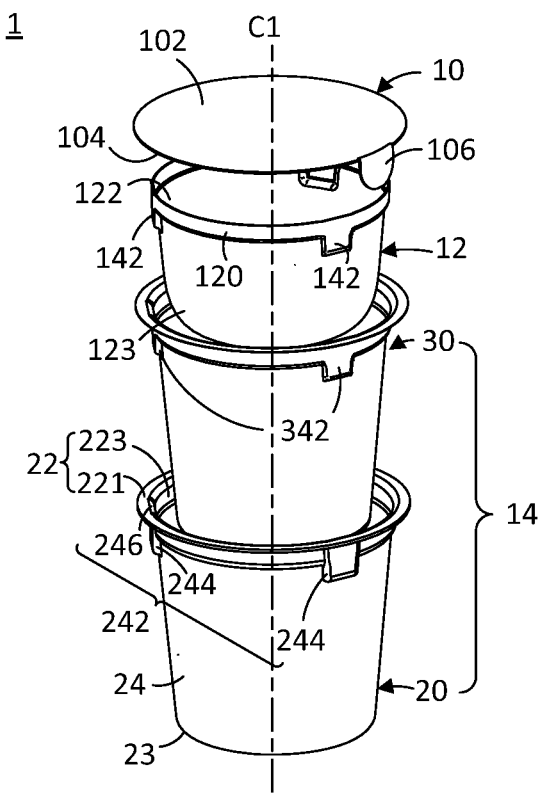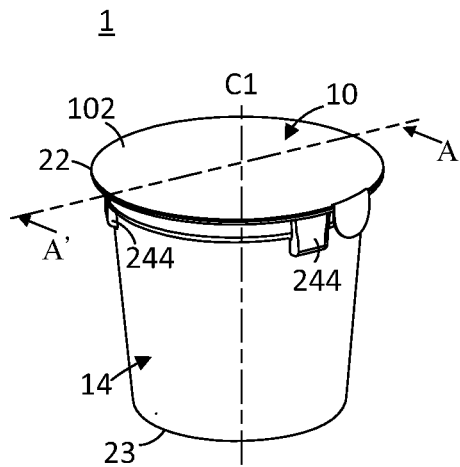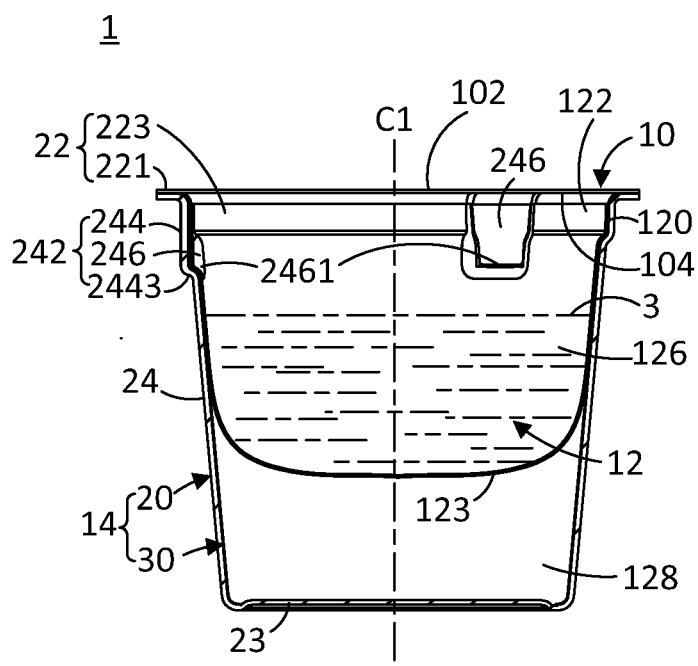
Fig. 1a
Fig. 1b
Fig. 1c

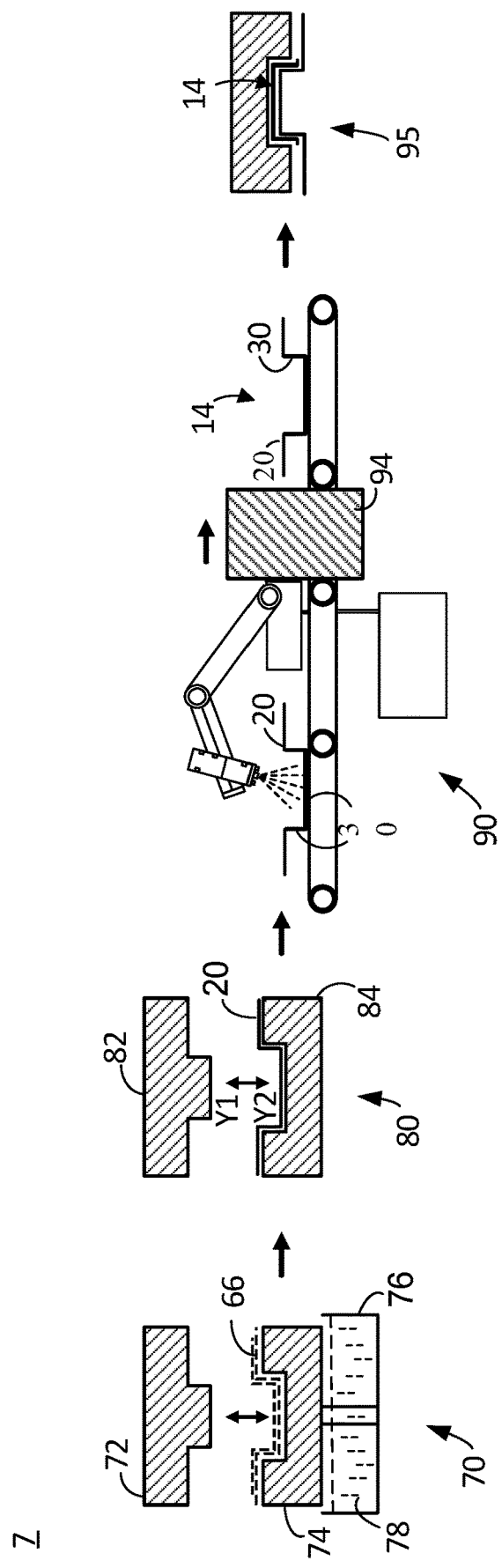

CARRIER USED FOR PREPARING BEVERAGE AND METHOD FOR FABRICATION OF THE SAME

FIELD OF THE INVENTION

The present invention relates to a carrier used for preparing beverage and a method for fabrication of the same, and more particularly, relates to a fabricating art for one-serve directly-brewing type beverage carriers.

BACKGROUND OF TECHNOLOGY

At present, due to variations in consumers' consuming-beverage habits, current one-serve directly-brewing type beverage carriers (or so-called "coffee capsule") are gradually popular with the consumers day by day. In an exemplary of a capsule product, with K-Cup®, that Keurig Inc. (Keurig®) introduced, there are major components which includes: a plastic container, a filter fixed inside said plastic container, and a top sealing lid employed for sealing an opening of said plastic container, wherein an upper compartment existed within itself said filter or between from an upper surface of said filter to the opening of said plastic container is acting on storage of a beverage medium (such as coffee bean grounds), and a lower compartment existed between from a bottom surface of said filter to a bottom portion of said plastic container. Said current beverage carriers are used with a beverage brewing machine (such as a K-Cup® coffee brewing machine that the Keurig Inc. (Keurig®) sold) so as to brew beverages (such as coffee) desired for the consumers. Structural illustrations of various types of such current one-serve directly-brewing type beverage carriers can refer to disclosures of U.S. Pat. Nos. 5,325,765, 5,840,189, 6,607,762, 7,398,726, 9,750,370B2 and a PCT international publication number WO/2011/031294.

Nevertheless, said overall plastic container of the aforementioned beverage carrier is made from a polymer-based material, especially in a thermoplastic polymer material. For example, as commonly known, polyethylene, EVOH, polystyrene, and so on and so forth. After the average consumers consumed the aforementioned beverage carriers, most of said plastic containers made from such petroleum-based plastics would be directly treated as discarded trashes, rather than recycling, or there is completely not any recycling channel found for recycling, to result in higher difficulty and cost of treating said plastic containers, made from such petroleum-based plastics, as renewable resources; however, said plastic containers made from such petroleum-based plastics would invoke an extreme damage to the environment if being massively discarded but not renewably recycled. Furthermore, the average consumers frequently drink high-temperature beverages brewed in said plastic containers made from such thermoformed plastics (e.g. coffee or tea brewed with a hot water having a temperature higher than 100° C.). During a prolonged period of time, it is liable to invoke the matters in health doubts and food safety for the human body. Afterward, although there are other kinds of plastic containers such as ones made from polypropylene (PP), with a capability of being reusable or recyclable, which are promoted by venders for the consumers. Such plastic containers are made by the same way of using the petroleum-based plastics, it still would invoke the matters in health doubts and food safety for the human body; besides, under the average consumers' behavior to discard those used plastic containers, it could not accomplish the environmental protection requirements for biodegradability or compostability, substantially.

Moreover, after a forming production line massively fabricating a number of plastic containers, for convenience on conveying said number of plastic containers to other assembling production line for component assembly, it needs to one-on-one nest said number of plastic containers in a head-to-tail aligning manner, as forming a commonly-known 'Cup stacking' status, before being conveyed. Afterward, while said number of plastic containers in alignment are proceed on the component assembly by the other assembling production line, the assembling production line needs to employ automatically component-picking equipment to draw out said plastic container from the alignment of said number of plastic containers, for being further assembled with corresponding filter and corresponding top sealing lid; however since nested depth and fitting scale between each two nested plastic containers in said cup-stacking alignment are inconsistent. If the fitting scale is too loose (or the nested depth is too shallow), a sliding fit likely happened therein would result in any one, of said plastic containers, departing from the cup-stacking alignment before being not drawn out yet, thereby incurring a drawback of losing the plastic container, or owing to central axes of said each two nested plastic containers being in unaligned arrangement to be up-and-down askew, said plastic container can not be accurately drawn out by the automatically component-picking equipment of the assembling production line, to invoke non-smooth run and low fabricating efficiency for the assembling production line; conversely, if fitting scale of nesting between two nested plastic containers in said cup-stacking alignment is too tight (or nested depth are too deep) as reaching an extent with transition fit, to readily make the two jointly nested plastic containers being drawn out together. This would similarly invoke non-smooth run, low fabricating efficiency, of the assembling production line. Even more, if a nesting pressure applied on between two plastic containers is excessive, it is apt to make the fitting scale between the both being overtight, as reaching an extent with interference fit, even going so far as to conceivably invoke cup body of said plastic container being deformed to become a waste. In said number of plastic containers in alignment, if fitting scale between a portion of nested plastic containers is too tight, whereas fitting scale between another portion of nested plastic containers are too loose, it would facilitate that the automatically component-picking equipment of the component-assembling production line can not apply the same force to accurately grab each of said paper-made containers from said number of plastic containers in alignment.

Hence, it is essential to provide an innovated carrier used for preparing beverage and a method for fabrication of the same so as to solve drawbacks of the aforementioned prior arts.

CONTENTS OF THE INVENTION

In order to solve drawbacks of the aforementioned prior arts, a primary objective of the present invention is to provide a carrier used for preparing beverage and a method for fabrication of the same, where by way of implementing a wet-fiber paper-molding process, a solid geometric shape of a paper-made container is integrally formed in conformity with FDA food grade registration certificate, thereby accomplishing the environmental protection requirements for biodegradability and biocompostability.

Another objective of the present invention is to provide a carrier used for preparing beverage and a method for fabrication of the same, where at least one protrusive portion is used to make a longitudinally position-limiting interval being retained between each two nested ones of said paper-made containers, for stop and position limit within nesting between the each two paper-made container, in a way to ensure that said respective paper-made container can be one-by-one accurately drawn out by the automatically component-picking equipment of the component-assembling production line, so as to raise workability and compatibility of component assembly of said paper-made container through the component-assembling production line, thereby raising fabricating efficiency of said carrier.

Another objective of the present invention is to provide a carrier used for preparing beverage and a method for fabrication of the same, where a clearance fit having a minimum transverse clearance larger than zero value is formed between annular cup walls of each two nested ones of said paper-made containers by at least one protrusive portion for stop and position limit within nesting between the each two paper-made containers, to ensure that the automatically component-picking equipment of the component-assembling production line can apply the same working force suitable for one-by-one accurately drawing out said respective paper-made container, thereby eliminating occurrence of the wastes.

Another objective of the present invention is to provide a carrier used for preparing beverage and a method for fabrication of the same, in a way of making demolding directions of the paper-made containers paralleling with the central axes of said paper-made containers, to be capable of avoiding that the existing undercut design complicates constitution of said mold assembly and its fabricating process.

To accomplish the aforementioned objectives, the present invention adopts the following technical solutions where a carrier is used for preparing beverage, comprising:

paper-made container, comprising a cup top portion having a first opening, a cup bottom portion, an annular cup wall standing in extension between said cup bottom portion and said cup top portion, and an isolating layer formed over an entire inner surface of said paper-made container;

filter, assembled inside said paper-made container to partition said paper-made container into a first carrying space that is defined between an upper surface of said filter and said cup top portion, for storage of medium corresponding to said beverage, and a second carrying space that is defined between a bottom surface of said filter and said cup bottom portion, for storage of a fluid of said beverage generated by action of said beverage medium; and sealing lid, having a bottom plane acting on firm adhesion onto an annular surface of said cup top portion, to watertightly seal said first opening and said first carrying space of said paper-made container in a way of preserving said filter inside said paper-made container, wherein a solid geometric shape of said paper-made container is integrally formed by way of compression forming of a mold assembly of wet-fiber paper-molding process, and by way of a demolding of said paper-made container along a demolding direction corresponding to said mold assembly, said annular cup wall is laterally formed with at least one protrusive portion and said demolding direction parallels to a longitudinally central axis of said annular cup wall, said at least one protrusive portion acts on ensuring that said respective paper-made container is sequentially one-by-one assembled to constitute said respective corresponding carrier while said respective paper-made container passes through component-assembling production line.

Preferably, said paper-made container, said isolating layer, said filter, and said sealing lid all belong to food-contacting material in conformity with FDA food grade registration certificate.

Preferably, said paper-made container conforms with bio-degradability and biocompostability standards of U.S. ASTM D6868.

Preferably, said paper-made container is made of bagasse.

Preferably, said paper-made container is made of bagasse and bamboo fibers.

Preferably, said paper-made container is made of bagasse and eucalyptus fibers.

Preferably, said paper-made container is made of bagasse and southern yellow pine fibers.

Preferably, said isolating layer is formed with waterproof material which is polylactide and is coated onto said inner surface of said paper-made container.

Preferably, said at least one protrusive portion comprises a number of separated lateral protrusions.

Preferably, said number of separated lateral protrusions are distributed over an upper half portion of an outer circumferential surface of said annular cup wall, and an outermost surface of said respective lateral protrusion is an evenly-flatted plane.

Preferably, said at least one protrusive portion further comprises a number of pits corresponding to locations where said lateral protrusions are located, and said number of pits are distributed over an upper half portion of an inner circumferential surface of said annular cup wall.

Preferably, a draft angle of said outer circumferential surface of said annular cup wall is θ1, and a draft angle of said outermost surface of said respective lateral protrusion is θ2, wherein θ1>θ2≥0° or θ1≥θ2>0°.

Preferably, said at least one protrusive portion is formed alongside a lower half portion of an inner circumferential surface of said annular cup wall and is extended toward said central axis, and an innermost surface of said at least one protrusive portion is an evenly-flatted plane.

Preferably, a draft angle of said inner circumferential surface of said annular cup wall is θ1', a draft angle of said innermost surface of said at least one protrusive portion is θ2', wherein θ1'>θ2'≥0° or θ1'≥θ2'>0°.

Preferably, said number of separated lateral protrusions are distributed over lower a half portion of an inner circumferential surface of said annular cup wall, an innermost surface of said lateral protrusion is an evenly-flatted plane.

Preferably, a draft angle of said inner circumferential surface of said annular cup wall is θ1', a draft angle of said innermost surface of said respective lateral protrusion is θ2", wherein θ1'>θ2"≥0° or θ1'≥θ2">0°.

Preferably, an annular top portion of said filter is formed with a second opening corresponding to a location where said first opening is located, a lateral rim of said annular top portion is joined onto an upper half portion of an inner circumferential surface of said annular cup wall, and said sealing lid is configured to watertightly seal said second opening of said filter.

Preferably, said filter is a filtration pack having a porous sieve.

Preferably, after said carrier is loaded inside a beverage brewing machine, an injecting needle tube of said beverage brewing machine pierces through said sealing lid to reach within said first carrying space and a draining needle tube of said beverage brewing machine pierces through said cup bottom portion to reach within said second carrying space, such that by said injecting needle tube pouring water to mutually act on said medium of said first carrying space, the beverage fluid is generated to flow from said first carrying space toward said second carrying space through filtration of said filter, and to drain outside said beverage brewing machine through said draining needle tube.

Besides, the present invention further adopts the following technical solutions where a stack assembly, comprises a number of said paper-made containers which are one-by-one nested in alignment, wherein by way of stopping and position limiting of said at least one protrusive portion between each two nested ones of said paper-made containers, a longitudinally position-limiting interval is retained between the each two nested paper-made containers, to ensure that said respective paper-made container is sequentially one-by-one drawn out, from said number of aligned paper-made containers, to implement assembling of said respective paper-made container, while said respective paper-made container passes through said component-assembling production line.

Preferably, by way of stopping and position limiting of said at least one protrusive portion between the that each two nested paper-made containers, it is ensured that central axes of the each two nested paper-made containers are collinear, and said position-limiting interval is extended in a direction paralleling with the central axes of said respective paper-made containers.

Preferably, said longitudinally position-limiting interval makes a clearance fit being formed, with a minimum transverse clearance larger than zero value, between said annular cup walls of the each two nested paper-made containers, said clearance fit is configured to ensure that said respective paper-made container is sequentially one-by-one drawn out, from said number of aligned paper-made containers, to implement assembling of said respective paper-made container, while said respective paper-made container passes through said component-assembling production line.

Preferably, while said longitudinal position-limiting interval is a constant, said minimum transverse clearance between said annular cup walls of the each two nested paper-made containers is inversely proportional to a transversally cross-sectional thickness of said annular cup wall.

Preferably, while the transversally cross-sectional thickness of said annular cup wall of said respective paper-made container is a constant, said minimum transverse clearance between said annular cup walls of the each two nested paper-made containers is directly proportional to said longitudinal position-limiting interval.

Besides, the present invention further adopts the following technical solutions where a method for fabrication of a carrier used for preparing beverage, comprises the following steps of:

step S1, massively fabricating a number of paper-made containers, and further comprising:

step S1A, by way of compression forming of a mold assembly of wet-fiber paper-molding process, integrally forming a solid geometric shape of a respective paper-made substrate which comprises a cup top portion having a first opening, a cup bottom portion, and an annular cup wall standing in extension between said cup bottom portion and said cup top portion, and by way of a demolding of said respective paper-made substrate along a demolding direction corresponding to said mold assembly, making said annular cup wall being laterally formed with at least one protrusive portion and said demolding direction paralleling with a central axis of said annular cup wall; and step S1B, forming an isolating layer over an entire inner surface of said respective paper-made substrate, thereby fabricating the respective corresponding paper-made container;

step S2, one-by-one nesting said number of paper-made containers, in alignment, into a stack assembly, wherein by way of stopping and position limiting of said at least one protrusive portion between each two nested ones of said paper-made containers, a longitudinally position-limiting interval is retained between the each two nested paper-made containers;

step S3, with said longitudinally position-limiting interval, sequentially one-by-one drawing out said respective paper-made container from said number of aligned paper-made containers of said stack assembly while said respective paper-made container passes through component-picking of a component-assembling production line, thereby sequentially one-by-one equipping said respective paper-made container with a corresponding filter which partitions inside said paper-made container into a first carrying space and a second carrying space;

step S4, filling medium of said beverage within said first carrying space of said respective paper-made container, to make an upper surface of said filter carrying said beverage medium; and step S5, making a bottom plane of a sealing lid firmly adhering onto an annular surface of a cup top portion of said corresponding paper-made container, to watertightly seal said first opening and said first carrying space of said respective paper-made container, and to preserve said corresponding filter and said carried beverage medium inside said paper-made container, for constituting said respective corresponding carrier.

Preferably, said step S1B further comprises: forming said isolating layer by coating waterproof material, which is polylactide, onto said inner surface of said paper-made container.

Preferably, said step S2 further comprises: by said longitudinally position-limiting interval, forming a clearance fit, with a minimum transverse clearance larger than zero value, between said annular cup walls of the each two nested paper-made containers, and said step S3 further comprises: utilizing said clearance fit to ensure that said respective paper-made container is sequentially one-by-one drawn out from said number of aligned paper-made containers of said stack assembly while said respective paper-made container passes through component-picking of said component-assembling production line, thereby sequentially one-by-one equipping said respective paper-made container with said corresponding filter.

Preferably, said step S2 further comprises: by way of stopping and position limiting of said at least one protrusive portion between the each two nested paper-made containers, it is ensured that central axes of the each two nested paper-made containers are collinear, and said position-limiting interval is extended in a direction paralleling with the central axes of said respective paper-made containers.

Preferably, said step S3 further comprises: by ultrasonic-wave processing, making said corresponding filter adhering onto an inner circumferential surface of said annular cup wall of said respective paper-made container.

Preferably, said step S4 further comprises: filling said respective paper-made container with an inert gas, and said step S5 further comprises: by said bottom plane of said sealing lid firmly adhering onto said annular surface of said cup top portion of said corresponding paper-made container, airtightly preserving said inert gas within said respective paper-made container.

The present invention accomplishes the following beneficial technical effects that: compared with the prior arts, the present invention utilizes compression forming of mold assembly of wet-fiber paper-molding process to integrally form a solid geometric shape of a paper-made container in conformity with FDA food grade registration certificate and in satisfying the environmental protection requirements for biodegradability and biocompostability, and by corresponding to a demolding direction of said mold assembly, annular cup wall of said paper-made container is laterally formed with at least one protrusive portion and said demolding direction parallels with a central axis of said annular cup wall, so as to avoid that undercut design complicates constitution of said mold assembly and its fabricating process, and by stopping and position limiting of said at least one protrusive portion within nesting between each two paper-made containers, a longitudinally position-limiting interval is retained between the each two nested paper-made containers, so as to ensure that said respective paper-made container can be one-by-one accurately drawn out by the automatically component-picking equipment of the component-assembling production line, so as to raise workability and compatibility of component assembly of said paper-made container through the component-assembling production line, thereby raising fabricating efficiency of said carrier, and by said longitudinally position-limiting interval, a clearance fit having a minimum transverse clearance larger than zero value is formed between annular cup walls of the each two nested paper-made containers, so as to ensure that the automatically component-picking equipment of the component-assembling production line can apply the same working force suitable for one-by-one accurately drawing out said respective paper-made container, thereby eliminating occurrence of wastes.

To further more realize technical characteristics and technical matters of the present invention, please refer to the following detailed description and attached drawings with relation to the present invention.

DESCRIPTION OF THE DIAGRAMS

The attached drawings that are described herein are used to provide further realization for the present invention, acting as a portion for constituting the present application, illustrated embodiments and its descriptions of the present invention are used for explaining the present invention, and do not constitute an improper limitation to the present invention. The drawings are that:

FIG. 1a, depicts a perspective component-exploded diagram of carrier, used for preparing beverage, of a first preferred embodiment according to the present invention;

FIG. 1b, depicts a perspective component-assembled diagram of the carrier as depicted in FIG. 1a;

FIG. 1c, depicts a transversally sectional view according to a sectioning line A-A' on the carrier as depicted in FIG. 1b;

FIG. 1d, depicts a front view of paper-made container of the carrier as depicted in FIG. 1a;

FIG. 2b, depicts a perspective component-assembled diagram of the carrier as depicted in FIG. 2a;

FIG. 3b, depicts a perspective component-assembled diagram of the carrier shown in FIG. 3a;

FIG. 4b, depicts a perspective component-assembled diagram of the carrier as depicted in FIG. 4a;

FIG. 5b, depicts a perspective component-assembled diagram of the carrier as depicted in FIG. 5a;

Figure 6:
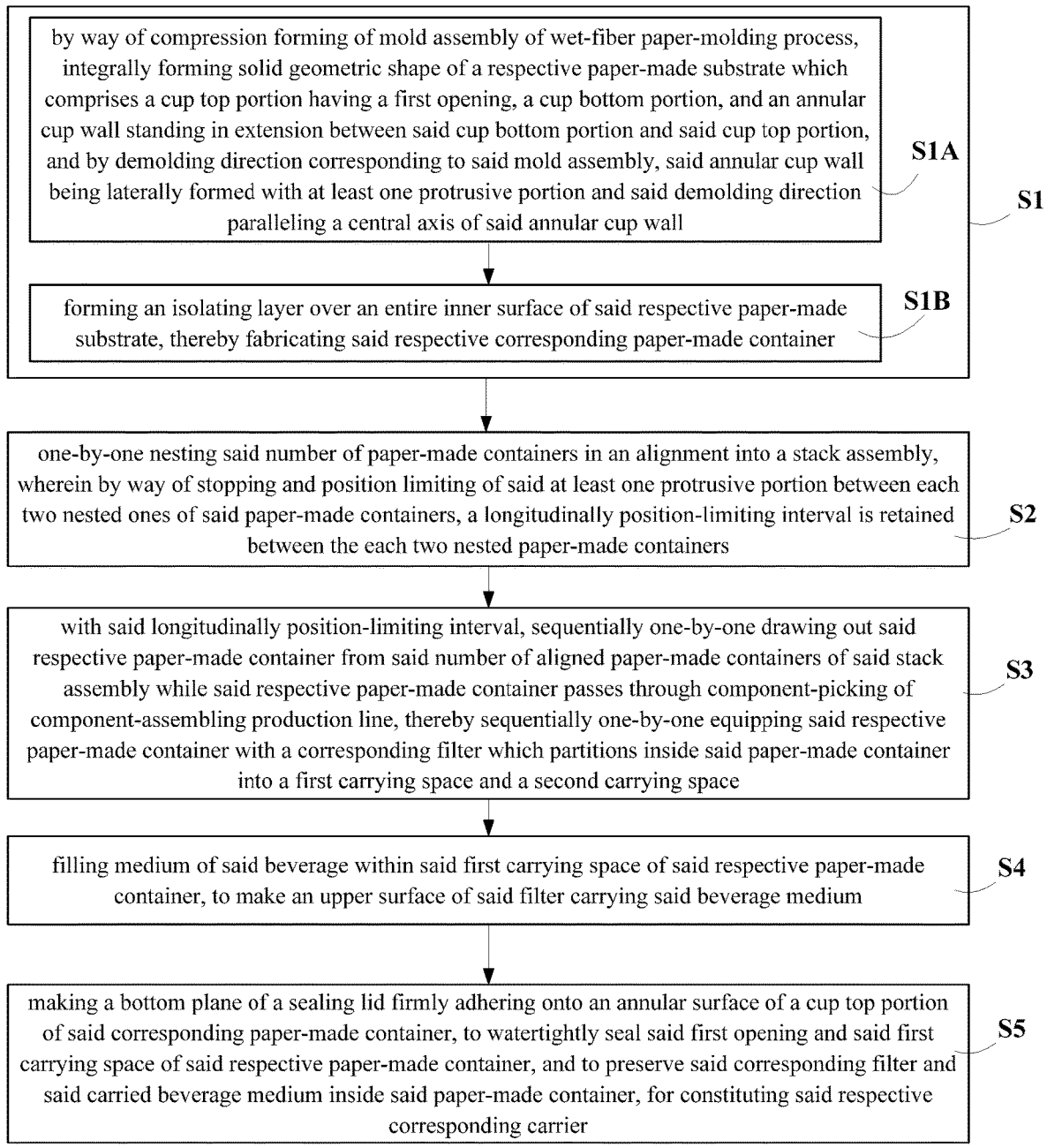

FIG. 6, depicts a flow chart of steps of a method, for fabrication of a carrier used for preparing beverage, according to a preferred embodiment of the present invention; and FIG. 7, depicts a structurally schematic diagram of consistently-and-automatically fabricating machines, used in a wet-fiber paper-molding process, which are adopted for the carrier used for preparing beverage and the method for fabrication of the same, according to a preferred embodiment of the present invention.

EMBODIMENTS OF SUBJECT MATTER

Described below will merge embodiments with drawings, of the present invention, for distinctly, completely describing technical solutions in the embodiments of the present invention, apparently the described embodiment is just a portion of the embodiments of the present invention, rather than all of the embodiments, and a scope to protection requested by the present invention should be limited to the described embodiment, but be defined in claims. Directional wordings mentioned in the present invention, such as [top], [bottom], [front], [rear], [left], [right], [inner], [outer], [lateral] and so forth, are used just for description and realization for the present invention, rather than limiting the present invention.

Please refer to illustrations shown in FIGS. 1a & 1b, wherein FIG. 1a depicts a perspective component-exploded diagram of carrier 1, used for preparing beverage, of a first preferred embodiment according to the present invention, and FIG. 1b depicts a perspective component-assembled diagram of the carrier 1 shown in FIG. 1a. In this preferred embodiment, said carrier 1 is an innovated design of an one-serve directly-brewing type beverage carrier (or so-called "coffee capsule") used with a beverage brewing machine (e.g. an existing K-Cup® coffee brewing machine which is sold by Keurig Inc. (Keurig®)), for implementing a brewing procedure of a beverage that consumers desire; nevertheless, said carrier 1 of the present invention is not therefore restricted to use only with the existing K-Cup® coffee brewing machine, but in reality if only having similar functions, other kinds of beverage brewing machines can also be used with said carrier 1 of the present invention. Besides, said carrier 1 of the present invention is not restricted in a capability of only brewing coffee, and is also used for brewing commonly known beverage or other kinds of beverage (e.g. teas or fruit juices or soups).

As illustrated in FIGS. 1a & 1b, said carrier 1 of the first preferred embodiment according to the present invention has primary components which comprises a sealing lid 10, a filter 12 and a paper-made container 14. Said sealing lid 10, said filter 12 and said paper-made container 14 are longitudinally nested together along a central axis C1 of said carrier 1, namely these assemblies which are assembled into the carrier 1 as depicted in FIG. 1b. Please further refer to an illustration in FIG. 1c, which depicts a transversally sectional view according to a sectioning line A-A' on the carrier shown in FIG. 1b. In FIG. 1c, it can be observed on a nested relationship of the respective components of said carrier 1 after the assembly thereof (detailed later).

Figure 1D:
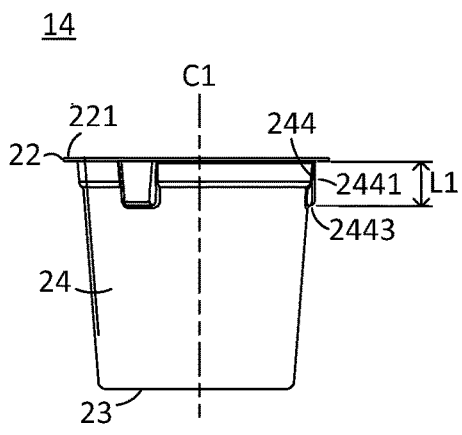
Figure 1E:
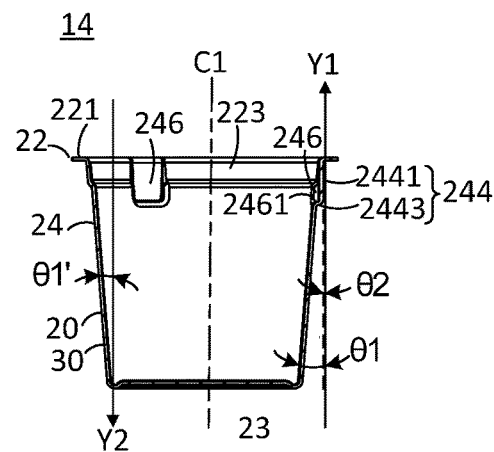
FIG. 1e, depicts a transversally sectional view of the paper-made container as depicted in FIG. 1d.

Please further refer to illustrations shown in FIGS. 1a, 1d & 1e, wherein FIG. 1d depicts a front view of the paper-made container 14 of the carrier 1 as depicted in FIG. 1a, and FIG. 1e depicts a transversally sectional view of the paper-made container 14 as depicted in FIG. 1d. Said paper-made container 14 of the first preferred embodiment according to the present invention is structured with a paper-made substrate 20 having a solid geometric shape, and an isolating layer 30 is formed in layer over an entire inner surface of said paper-made substrate 20. Said solid geometric shape of said paper-made substrate 20 comprises a cup top portion 22 located at an upper thereof, a cup bottom portion 23 located at a lower thereof, and an annular cup wall 24 standing in extension between said cup top portion 22 and said cup bottom portion 23. Said cup top portion 22 is formed with an annular surface 221 extended upwardly, and a first opening 223 located at a center of the annular surface 221. Said cup bottom portion 23 is a round end portion that is completely sealed.

In a fabricating exemplar of the present invention, said paper-made container 14 is fabricated by consistently-and-automatically fabricating machines 7 of a wet-fiber paper-molding process as depicted in FIG. 7, for implementation of mass fabrication thereof. With respect to said consistently-and-automatically fabricating machines 7 of the wet-fiber paper-molding process, it can refer to an introduction in a Chinese utility model patent application number CN201820101475.3, filed on Jan. 22, 2018, (a part of the contents of which are incorporated by reference herein), which is primarily structured with a pulp-dredging and pre-compression equipment 70, a thermo-compression forming equipment 80 for paper-molded article, a surface coating equipment 90 for paper-molded article, and a trimming equipment 95 for paper-molded article, as illustrated in FIG. 7. According to the present invention, firstly a couple of mold assembly 72, 74 of said pulp-dredging and pre-compression equipment 70 are employed to collectively dredge slurry material body 66 consisting of wet plant fibers, from within a slurry tank 76 storing slurry 78, and then to pre-compress the slurry material body 66 into a wet blank, and next another couple of mold assembly 82, 84 of said thermo-compression forming equipment 80 for paper-molded article are employed to further perform a thermo-compression forming on the pre-compressed slurry material body 66, thereby integrally forming an inner and outer surface of an entire solid geometric shape of said paper-made substrate 20 of the present invention (substantially the same as an entire solid geometric shape of said paper-made container 14), through two demolding directions Y1, Y2 which are parallel but inverse to each other; next by way of automatically atomization-spraying of said surface coating equipment 90 for paper-molded article, a waterproof material in conformity with the environmental protection is coated onto the entire inner surface of said paper-made substrate 20 of the present invention, thereby forming said isolating layer 30 on the entire inner surface of said paper-made substrate 20. In this preferred embodiment, the surface coating equipment 90 for paper-molded article further comprises a heat-drying device 94 (i.e. a baking tunnel) used for temperature-drying the waterproof material coated on said inner surface of said paper-made substrate 20 to form said isolating layer 30; next, by way of trimming of said trimming equipment 95 for paper-molded article, a superfluous portion in said paper-made container 14 of the present invention is cut away to form a finished article of said corresponding paper-made container 14.

Detailed descriptions for structure and working of said consistently-and-automatically fabricating machines 7 of said wet-fiber paper-molding process as depicted in FIG. 7, can further refer to an introduction in a Chinese utility model patent application number CN201820101475.3, but should be noted that it is just one of the illustrations of consistently-and-automatically fabricating machines of wet-fiber paper-molding process, which are adopted by the present invention, and is not therefore restricted to necessarily use said consistently-and-automatically fabricating machines 7 of the wet-fiber paper-molding process as depicted in FIG. 7. That is because in other embodiment, any consistently-and-automatically fabricating machines of the wet-fiber paper-molding process, having a capability of accomplishing integrally forming and automatically mass fabrication of said solid geometric shape of said paper-made substrate 20 of the present invention, all can be adopted. Besides, it should be further noted that the Chinese utility model patent application number CN201820101475.3 is disclosed in applying for fabricating a package, such as a carton and an interior box, for 3C electronic product. Since an average package used for 3C electronic product has both of a certain structural strength and a graphic printing that is rendered exquisitely on the packaging appearance, it would invokes that the package material for 3C electronic product, in addition to treating waste papers and natural plant fibers as its basic raw materials, further needs to addition-into of chemicals, such as a fluorescent brightener, wet strength agent, antifoaming agent and so forth, and an inner and outer surface of the package needs to be coated thereon with a lamination layer or binding layer which is a film composed of a petroleum-based polymer. For example, polyethylene (PE) and/or polypropylene (PP) and so on, and an outer surface of the package is further printed thereon with a chemical-ink graphic layer, these added chemicals all do not conform with these current environmental protection requirements. Nevertheless, it is different therefrom that in the present invention, the existing wet-fiber paper-molding process is used to entirely and integrally form the solid geometric shape of said paper-made substrate 20 of said paper-made container 14, with said slurry material body 66 structured of natural plant fibers, and simultaneously is used for massively fabricating said paper-made substrate 20 of the paper-made container 14 as depicted in FIG. 1a, and for coating said environmental-protection waterproof material (i.e. polylactide) onto said paper-made substrate 20 to form said isolating layer 30 for waterproofing. In this preferred embodiment, said paper-made substrate 20 of said paper-made container 14 fabricated by the wet-fiber paper-molding process contains bagasse and bamboo fibers; in another embodiment, said paper-made substrate 20 of said paper-made container 14 fabricated by the wet-fiber paper-molding process contains 100% wt bagasse, as calculated in weight percentage; in another embodiment, said paper-made substrate 20 of said paper-made container 14 fabricated by the wet-fiber paper-molding process contain 40% wt bagasse and 60% wt eucalyptus fibers; in another embodiment, said paper-made substrate 20 of said paper-made container 14 fabricated by the wet-fiber paper-molding process contain 40% wt bagasse and 60% wt southern yellow pine fibers. Besides, in this preferred embodiment, said waterproof material is polylactide (PLA);

however, in other embodiment, said waterproof material may be other kinds of biodegradable plastic which comprise but is not restricted to, for example, one or a composition of a few of a plant starch, polycaprolactone (PCL), polyvinyl alcohol (PVA), poly(butylene succinate) (PBS), and silicone. With the foregoing various of environmental protection materials, it can not only make said paper-made container 14 of the present invention to be a food-contacting material in conformity with of U.S. FDA food grade registration certificate, but can also further accomplish the environmental protection requirements for biodegradability and biocompostability. The herein-mentioned 「E Food-contacting materials in conformity with FDA food grade registration certificated y 」 comprises but is not restricted to, for example, a paper-made article required for U.S. FDA CFR 21 176.170 and a polymer coating layer required for U.S. FDA CFR 21 175.300, in conformity with testing items authenticated by FDA. The herein-mentioned 「E Environmental protection requirements of biodegradability and biocompostability y 」 denotes that one comprises but is not restricted to, for example, conforming with one of U.S. ASTM D6868, ASTM D5338-92, ASTM D6002-96 and ASTM D6400-99 or the number of the biodegradability and biocompostability standards.

Please refer to the illustrations in FIGS. 1a, 1d & 1e. To benefit a capability of smoothly demolding said paper-made substrate 20 from said mold assembly 82, 84 as depicted in FIG. 7, said compression-formed paper-made substrate 20 is demolded along two mutually-inversed demolding directions Y1, Y2 respectively corresponding to said mold assembly 82, 84 and paralleling with a longitudinally central axis C1 of said annular cup wall 24 (substantially the same as the central axis C1 of the paper-made container 14 or the carrier 1 as depicted in FIG. 1a), for respectively forming the inner and outer surface of said paper-made substrate 20. This leads an outer circumferential surface of said annular cup wall 24 to be formed with a positive draft angle θ1 relative to said demolding direction Y1 and leads an inner circumferential surface of said annular cup wall 24 to be formed with another positive draft angle θ1' relative to said demolding direction Y2, thereby making said solid geometric shape of said paper-made substrate 20 as a semi-cone structure (as shown in FIG. 1a). After said compression-formed paper-made substrate 20 of said paper-made container 14 is demolded along said demolding direction Y1, said annular cup wall 24 is further laterally formed outwardly with at least one protrusive portion 242 (as shown in FIGS. 1a & 1e). In the present invention, a design of said at least one protrusive portion 242 is used for ensuring that while said respective paper-made container 14 passes through a component-assembling production line (not shown), said respective paper-made container 14 can be sequentially one-by-one assembled to constitute said respective corresponding carrier 1 (as depicted in FIG. 1b). In this preferred embodiment, said at least one protrusive portion 242 comprises a number of separated lateral protrusions 244 which are distributed in identical interval thereamong, along an upper half portion of the outer circumferential surface of said annular cup wall 24; preferably, an amount of said number of separated lateral protrusions 244 is three lateral protrusions 244 distributed in identical interval thereamong (as depicted in FIG. 1a), so as to ensure that while said paper-made container 14 is up-and-down nested with and another one paper-made container 14, both said paper-made containers 14 are subject to a stopping and position limiting of said number of separated lateral protrusions 244 located between the both said paper-made containers 14 (as depicted in FIG. 1f), such that said nested paper-made containers 14 all retains a firmed and non-leaned capability, especially for facilitating that the central axes C1 of each two nested ones of said paper-made containers 14 all can retain a substantial collinearity thereof; nevertheless, the amount of said number of separated lateral protrusions 244 is not therefore restricted to three, and can be designed into a different amount on actual demands.

Besides, in this preferred embodiment depicted in FIGS. 1a, 1d & 1e, an outermost surface 2441 of said respective lateral protrusion 244 is formed with an evenly-flatted plane and said outermost surface 2441 is downwardly extended, from said cup top portion 22, in a specific length L1 to reach and terminate at a stopping end portion 2443. Said outermost surface 2441 of the respective lateral protrusion 244 is formed with a positive draft angle θ2 relative to said demolding direction Y1, and a relationship between positive draft angle θ1 of said outer circumferential surface of said annular cup wall 24 and positive draft angle θ2 of said outermost surface of said lateral protrusion 244 is θ1>θ2≥0, thereby avoiding said outermost surfaces 2441 of the lateral protrusions 244 forming the existing undercut-design structure, e.g. a laterally cave-surface or convex-surface forming of a product that needs to employ extra oblique molds and/or transversal molds. Such a laterally cave-surface or convex-surface forming will be formed with a negative draft angle relative to said demolding direction Y1. The existing undercut design would complicate constitution of said corresponding mold assembly, and its fabricating process and time, to invoke raising fabricating cost. However, in other embodiment, a relationship between positive draft angle θ1 of said outer circumferential surface of said annular cup wall 24 and positive draft angle θ2 of said outermost surface 2441 of said lateral protrusion 244 can also be designed into θ1≥θ2>0°. Please further refer to the illustrations in FIGS. 1a, 1c & 1e where in this preferred embodiment, said at least one protrusive portion 242 further comprises a number of pits 246 corresponding to the locations where said lateral protrusions 244 are located, said number of pits 246 are also distributed, in identical interval thereamong, over an upper half portion of said inner circumferential surface of said annular cup wall 24. A lower of said respective pits 246 is further formed with a seat portion 2461 inwardly extended correspondingly to a location of said stopping end portion 2443 of said lateral protrusion 244. Besides, said respective number of pits 246 is also formed with a positive draft angle (not shown) relative to said demolding direction Y2. In this preferred embodiment, in a way of coating waterproof material onto said paper-made substrate 20 to form said isolating layer 30, a lateral rim of said isolating layer 30 is further formed with a number of convex-surface structures 342 of said pits 246 respectively corresponding to said paper-made substrate 20.

After a number of said paper-made containers 14 are massively fabricated by said consistently-and-automatically fabricating machines 7 of said wet-fiber paper-molding process as depicted in FIG. 7, next said number of paper-made containers 14 need to pass through component-assembling production line (not shown) so as to be assembled therein with respective corresponding components (as said sealing lid 10 and the filter 12 depicted in FIG. 1a), thereby finalizing an assembly of said whole carrier 1 (as depicted in FIG. 1b). For conveniences on conveying said number of paper-made containers 14, and on the automatically component-picking equipment of the component-assembling production line smoothly picking up said respective paper-made container 14, from said number of paper-made containers 14, to assemble the respective corresponding components thereto, said number of paper-made containers 14 as depicted in FIGS. 1f & 1g have to firstly be one-by-one nested, in an alignment, into a stack assembly thereof, namely up-to-down nesting said cup bottom portion 23 of one of said paper-made containers 14 into an inside of said first opening 223 of said cup top portion 22 of another one of said paper-made containers 14, and so on, thereby constituting a stack assembly 6. The component-assembling production line and its automatically component-picking equipment herein mentioned all are as the prior arts, e.g. the automatically component-picking equipment can be an electrically-controlled robotic arm or automatically material-feeding equipment, and therefore a repeated description to its structures will be omitted herein. For convenience on realization, although the stack assembly 6 illustrated in FIGS. 1f & 1g contains only two nested of said paper-made containers 14, it is not therefore restricted to a nested amount of said paper-made containers 14 in the stack assembly 6, and substantially the amount of paper-made container 14 to be nested relies on demands. For example, the stack assembly 6 illustrated in FIGS. 1h & 1i contains three nested of said paper-made containers 14.

Figure 1F:
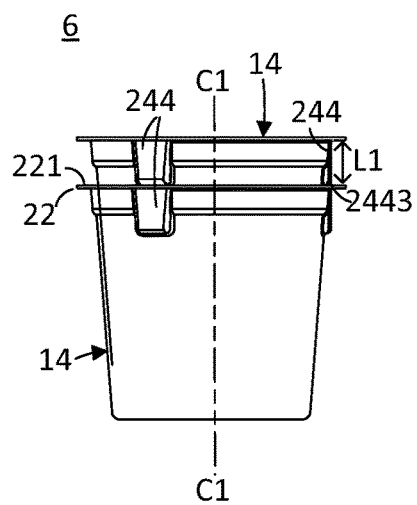
FIG. 1f, depicts two of the paper-made container, as depicted in FIG. 1d, which are one-by-one nested, in an alignment, into a stack assembly.
Figure 1G:
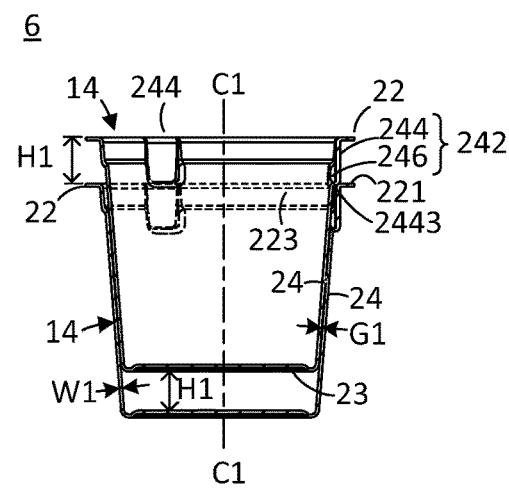
FIG. 1g, depicts a transversally sectional view of the two nested paper-made containers as FIG. 1f.
Figure 1H:
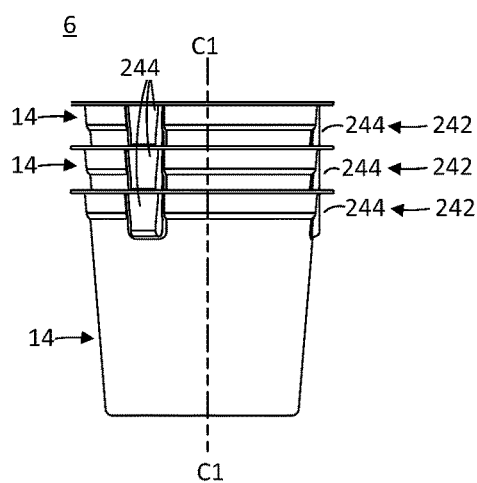
FIG. 1h, depicts three of the paper-made container, as depicted in FIG. 1g, which are one-by-one nested, in an alignment, into a stack assembly.
Figure 1I:
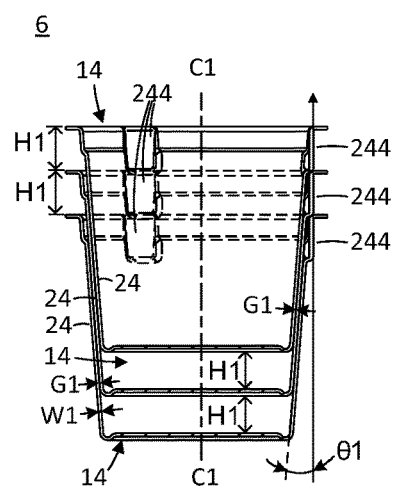
FIG. 1i, depicts a transversally sectional view of the three nested paper-made containers as depicts FIG. 1h.

As illustrated in FIGS. 1f & 1g, during said two paper-made containers 14 are up-and-down nested to constitute said stack assembly 6, said cup bottom portion 23 of said paper-made container 14 located at an upper is inserted into said first opening 223 of the cup top portion 22 of said paper-made container 14 located at a lower, next by said respective lateral protrusions 244 of said at least one protrusive portion 242 of said paper-made container 14 in the upper being positioned (or clamped) between the two up-and-down nested paper-made containers 14, it facilitates that the stopping end portion 2443 of said respective lateral protrusion 244 of said paper-made container 14 in the upper stops on said annular surface 221 of the cup top portion 22 of said paper-made container 14 in the lower, such that a nested depth between the two nested paper-made containers 14 is position-limited to said specific length L1 of said respective lateral protrusion 244, so as to make a longitudinal position-limiting interval H1 (H1≥L1) retained between each two nested ones of said paper-made containers 14, thereby ensuring that while said respective paper-made container 14 passes through said component-picking of the automatically component-picking equipment of the component-assembling production line, said respective paper-made container 14 is sequentially one-by-one drawn out from said two aligned paper-made containers 14 of the stack assembly 6 (rather than drawing out the two nested paper-made containers 14 together), to benefit implementing a assembly of respective corresponding components (as said filter 12 and sealing lid 10 depicted in FIG. 1a) for said respective paper-made container 14. In this preferred embodiment, by way of stopping and position limiting of said respective lateral protrusions 244 of said at least one protrusive portion 242 located between said each two nested paper-made containers 14, it can ensure that the central axes C1 of said each two nested paper-made containers 14 are collinear, and said position-limiting interval H1 is extended in a direction paralleling with the central axis C1 of said respective paper-made container 14, so as to raise a firmed and non-leaned manner of nesting between all the paper-made containers 14 in the stack assembly 6, and to assist a capability of the automatically component-picking equipment of the component-assembling production line accurately, sequentially one-by-one picking from said nested paper-made containers 14 in alignment. As depicted in FIGS. 1h & 1i, by way of stopping and position limiting of said respective lateral protrusions 244 of said at least one protrusive portion 242 located between said each two nested paper-made containers 14, it facilitates that respective nested depth and fitting scale within said three aligned paper-made containers 14 of the stack assembly 6 throughout is consistent with each other. As depicted in FIGS. 1g and 1i, in this preferred embodiment, said longitudinally position-limiting interval H1 makes a clearance fit being formed, with a minimum transverse clearance larger than zero value G1, between said annular cup walls 24 of the each two nested paper-made containers 14. Said clearance fit relies on a scale of the minimum transverse clearance larger than zero value G1, for ensuring that while said respective paper-made container 14 passes through component-picking of the automatically component-picking equipment of the component-assembling production line, said respective paper-made container 14 is sequentially one-by-one drawn out from said number of nested paper-made containers 14 in alignment, rather than drawing out some of said number of paper-made containers 14 together in the picking up, resulted from that fitting scale of nesting between said number of paper-made containers 14 is over tight, or rather than a few of said paper-made containers 14 that are not picked yet immediately drawing out or falling down by it self, resulted from that the fitting scale of the nesting is too loose. The scale of said minimum transverse clearance G1 is involved with a transversally cross-sectional thickness W1 of said annular cup wall 24 and said longitudinal position-limiting interval H1 between said each two nested paper-made containers 14 (draft angles θ1 of said respective paper-made containers 14 all are the same, as depicted in FIG. 1*i*). In an embodiment, while said transversally cross-sectional thickness W1 of said annular cup wall 24 is 0.6 mm and said longitudinal position-limiting interval H1 is 8 mm, said minimum transverse clearance G1 is 0.12 mm but is not therefore restricted in the scale of said minimum transverse clearance G1. For example, in another embodiment, while the transversally cross-sectional thickness W1 of said annular cup wall 24 is 0.4 mm and said longitudinal position-limiting interval H1 is 5 mm, said minimum transverse clearance G1 is 0.09 mm. In accordance to a practical test, it is found that while said longitudinal position-limiting interval H1 is a constant, said minimum transverse clearance G1 between said annular cup walls 24 of the each two nested paper-made containers 14 is inversely proportional to said transversally cross-sectional thickness W1 of said annular cup wall 24; in other words, while said longitudinal position-limiting interval H1 is a constant, the larger the transversally cross-sectional thickness W1 of said annular cup wall 24 becomes gradually, the smaller said minimum transverse clearance G1 between said each two nested paper-made containers 14 becomes gradually. In another embodiment, while the transversally cross-sectional thickness W1 of said annular cup wall 24 of said respective paper-made container 14 is a constant, said minimum transverse clearance G1 between said annular cup walls 24 of the each two nested paper-made containers 14 is directly proportional to said longitudinal position-limiting interval H1; in other words, while the transversally cross-sectional thickness W1 of said annular cup wall 24 of said respective paper-made container 14 is a constant, the larger said longitudinal position-limiting interval H1 becomes gradually, the larger said minimum transverse clearance G1 between said each two nested paper-made containers 14 becomes gradually.

Please further refer to the illustrations in FIGS. 1*a* & 1*c*. Said filter 12 of said carrier 1 is integrally formed with a vertical annular top portion 120, a second opening 122 located at a center of said annular top portion 120, and a completely-sealed convex-curve bottom portion 123. In this preferred embodiment, a lateral rim of said annular top portion 120 of said filter 12 is further formed with a number of convex-surface structures 142 respectively corresponding to said pits 246 of said paper-made container 14. While said paper-made container 14 passes through said component-assembling production line for implementing the assembly of said filter 12 thereto, the lateral rim of said vertical annular top portion 120 of said filter 12 surrounds said entire inner circumferential surface of said annular cup wall 24 of said paper-made container 14 and is watertightly joined onto the upper half portion of said inner circumferential surface of said annular cup wall 24, for assembling said filter 12 within said paper-made container 14, namely suspending said filter 12 in the upper half portion of said inner circumferential surface of said annular cup wall 24 of said paper-made container 14, thereby partitioning said paper-made container 14 into a first carrying space 126 and a second carrying space 128, and making the second opening 122 upwardly corresponding to a location where said first opening 223 of said paper-made container 14 is located, and making the number of convex-surface structures 142 of said filter 12 respectively, correspondingly extending inside said number of pits 246 of said paper-made container 14. In this preferred embodiment, an ultrasonic-wave processing is applied to hot-melt thermoplastic polymer object (e.g. an extra adhesive or any kind of component itself). In a case of polylactide (PLA), silicone or natural latex, the lateral rim of said vertical annular top portion 120 of said filter 12 is adhered onto an upper half portion of the inner circumferential surface of said annular cup wall 24 of said paper-made container 14; but it is not therefore restricted to use the ultrasonic-wave processing, other kinds of existing adhering processing can also be used. Said first carrying space 126 is defined between from upper surface of said convex-curve bottom portion 123 of said filter 12 to said cup top portion 22, for storage of a medium 3 corresponding to said beverage. Said second carrying space 128 is defined between from bottom surface of said convex-curve bottom portion 123 of said filter 12 to said cup bottom portion 23, for storage of a fluid of said beverage which is generated after action of said beverage medium 3; in an embodiment, said respective paper-made container 14 further stores inert gas (e.g. one or mixing of nitrogen gas, carbon dioxide and so on) therein, for implementing freshness preservation of said beverage medium 3. In this preferred embodiment, said beverage medium 3 comprises but is restricted to, for example, one of coffee bean grounds, teas, a dried plants or fruits, a concentrated or extracted substance. In this preferred embodiment, said filter 12 is a filtration pack having a porous sieve, and said filter 12 is made from a food-contacting material in conformity with FDA food grade registration certificate testing item, which comprises but is not restricted to, for example, a paper-made article conforming with U.S. FDA CFR 21 176.170, in FDA food grade registration certificate, and also conforming with one or a number of biodegradability and biocompostability standards comprising but being not restricted to U.S. ASTM D5338-92, ASTM D6002-96 and ASTM D6400-99. In another embodiment, said filter 12 is made from non-woven fabric PET, in conformity with a testing item, comprising but being not restricted to, for example, a PET article of U.S. FDA CFR 21 177.1630, in U.S. FDA food grade registration certificate.

Please further refer to the illustrations in FIGS. 1*a*, 1*b* & 1*c*. Said sealing lid 10 of said carrier 1 is integrally formed with a top plane 102, a bottom plane 104, and a tab 106 located along an outer circumferential fringe of said sealing lid 10. After said filter 12 is assembled within said paper-made container 14, next said paper-made container 14 passes through another component-assembling production line for implementing a assembly of said sealing lid 10 thereto, said bottom plane 104 of said sealing lid 10 is further firmly adhered onto said entire annular surface 221 of said cup top portion of said paper-made container 14, to watertightly seal said first opening 223 of said paper-made container 14 and said first carrying space 126, thereby watertightly preserving said filter 12 and its contained beverage medium 3 inside said paper-made container 14, and simultaneously watertightly sealing said sealing lid 10 said second opening 122 of said filter 12. In an embodiment, said sealing lid 10 simultaneously airtightly seals the inert gas (e.g. one or mixing of nitrogen gas, carbon dioxide and so on) stored within said paper-made container 14. In this preferred embodiment, an ultrasonic-wave processing is applied to hot-melt a thermoplastic polymer object (e.g. extra adhesive or any kind of component itself). In a case of polylactide (PLA), silicone or natural latex, it facilitates that said bottom plane 104 of said sealing lid 10 is firmly adhered, in a plane-to-plane manner, onto said entire annular surface 221 of said cup top portion 22 of said paper-made container 14, in conformity with testing items, comprising but being not restricted to, for example, a sealing ring material of a food container required for U.S. FDA CFR 21

177.1210, of FDA food grade registration certificate; nevertheless, it is not therefore restricted to use the ultrasonic-wave processing, other kinds of the existing adhering processing can also be used. In this preferred embodiment, said sealing lid 10 is a paper-made article having an environmental protection and waterproof coating layer (e.g. a polylactide layer) and is made from a food-contacting material in conformity with FDA food grade registration certificate testing items, which comprises but is not restricted to, for example, a paper-made article required for U.S. FDA CFR 21 176.170 and a polymer coating layer required for U.S. FDA CFR 21 175.300, and also conforms with one or a number of biodegradability and biocompostability standards, comprising but being not restricted to U.S. ASTM D5338-92, ASTM D6002-96 and ASTM D6400-99. In another embodiment, said sealing lid 10 is made from aluminum foil in conformity with one of or both of testing items, comprising but being not restricted to, for example, an organic coating layer, a metallic and electroplated article required for U.S. FDA CFR 21 175.300, and a fabrication of a metal article required for U.S. FDA CFR 21 178.3910, in U.S. FDA food grade registration certificate.

In an actual application of said assembled carrier 1 (as depicted in FIGS. 1b & 1c) of the present invention, after said carrier 1 is loaded inside a beverage brewing machine (not shown) and said beverage brewing machine is actuated, an injecting needle tube of said beverage brewing machine will downwardly pierce through said sealing lid 10 of said carrier 1 in a limited length extended to reach inside said first carrying space 126, and similarly a draining needle tube of said beverage brewing machine upwardly pierce through said cup bottom portion 23 of said carrier 1 in a limited length extended to reach inside said second carrying space 128. Next by said injecting needle tube pouring a liquid (e.g. the foregoing hot water in a temperature 60° C.) to mutually act on said beverage medium 3 stored within said first carrying space 126 and thereby brewing a fluid of said beverage (e.g. a coffee fluid), beverage medium 3 undissolved in said liquid occurs in a beverage residual form. Since effect of a gravity and/or a gas pressure thereof, said beverage fluid will pass through the filtration of said filter 12 located between the two carrying spaces 126, 128, gradually flowing from said first carrying space 126 toward said second carrying space 128. This facilitates that said beverage residual is left behind inside said first carrying space 126 of said filter 12, and only said beverage fluid is permitted to be gradually dripped to said second carrying space 128; next, said beverage fluid is drained out, through said draining needle tube located inside said second carrying space 128, to a beverage cup (e.g. a coffee cup) located outside said beverage brewing machine, for the consumer. In an embodiment, the aforementioned beverage brewing machine can be but not be restricted to a K-Cup® coffee brewing machine that the Keurig Inc. (Keurig®) produces. That is because in other embodiment any one current beverage brewing machine having a capability of collocating with said carrier 1 of the present invention to run can be used. Since the aforementioned beverage brewing machine such as the K-Cup® coffee brewing machine is a product existed in the market, the descriptions to its function and structure will be omitted herein.

Figure 2A:
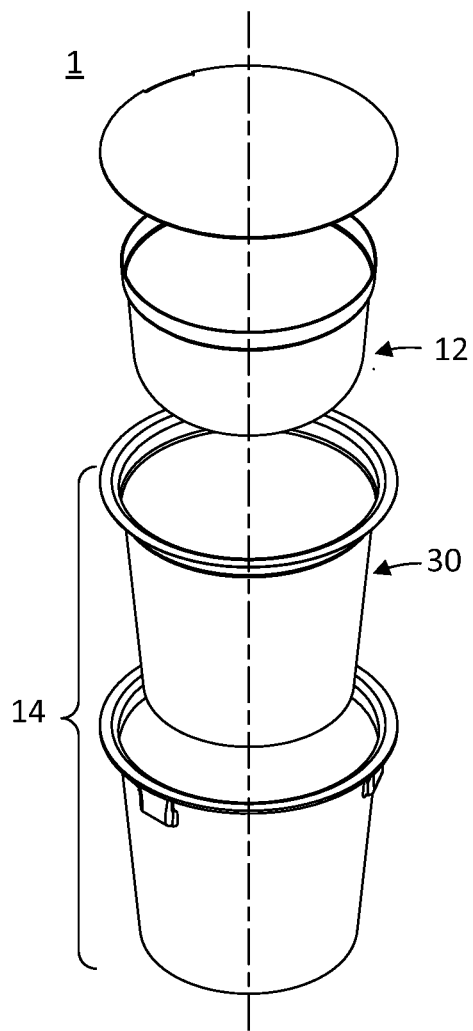
FIG. 2a, depicts a perspective component-exploded diagram of the carrier, used for preparing beverage, according to a second preferred embodiment of the present invention.
Figure 2B:
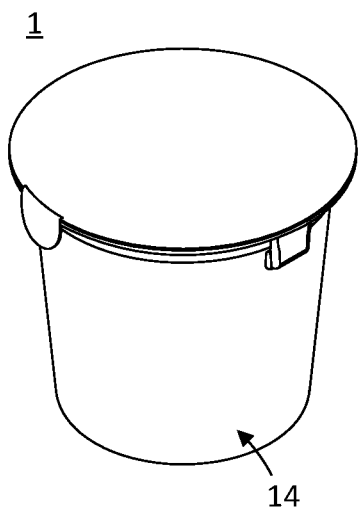
Figure 2C:
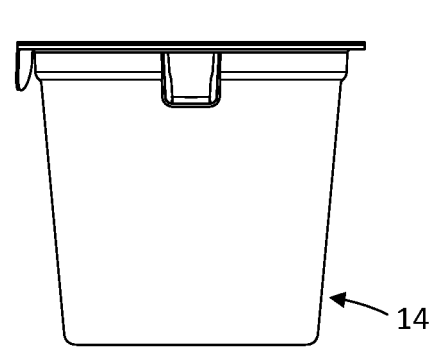
FIG. 2c, depicts a front view of paper-made container of the carrier according to depiction in FIG. 2b.

Please refer to the illustrations as shown in FIGS. 2a, 2b & 2c, which depict a carrier 1 of a second preferred embodiment according to the present invention. The second preferred embodiment has differences, from the aforementioned first preferred embodiment, that: in the second preferred embodiment, outer lateral rims of both the filter 12 of said carrier 1 and the isolating layer 30 of the paper-made container 14 all are formed without the convex-surface structures 142, 342 of the aforementioned first preferred embodiment as depicted in FIG. 1a. As to the other structures of said carrier 1 of the second preferred embodiment, its related function, fabricating and assembling process all are the same as the first preferred embodiment, and therefore its descriptions will be omitted hereinafter.

Figure 3A:
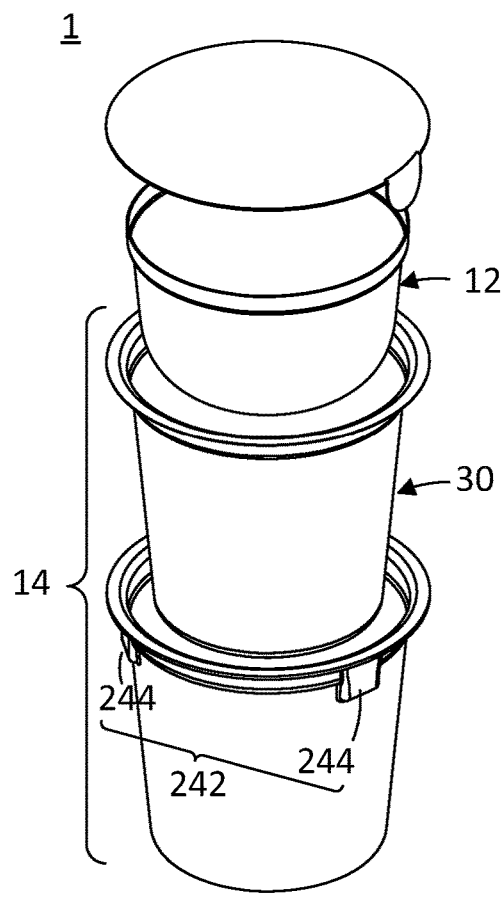
FIG. 3a, depicts a perspective component-exploded diagram of carrier, used for preparing beverage, according to a third preferred embodiment of the present invention.
Figure 3B:
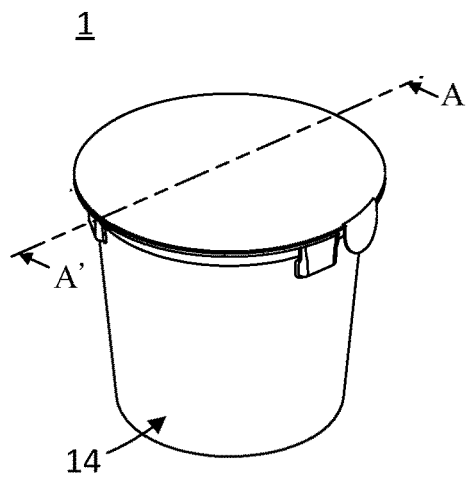
Figure 3C:
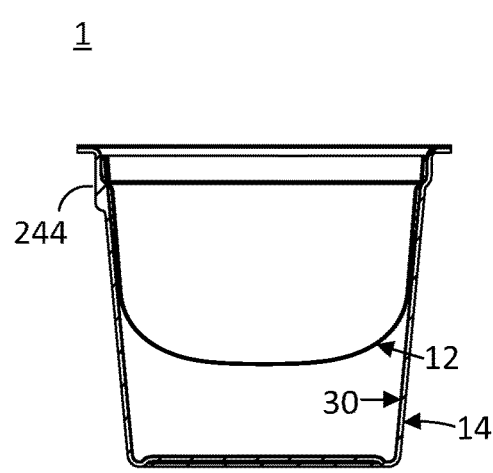
FIG. 3c, depicts a transversally sectional view according to a sectioning line A-A' on the carrier as depicted in FIG. 3b.
Figure 3D:
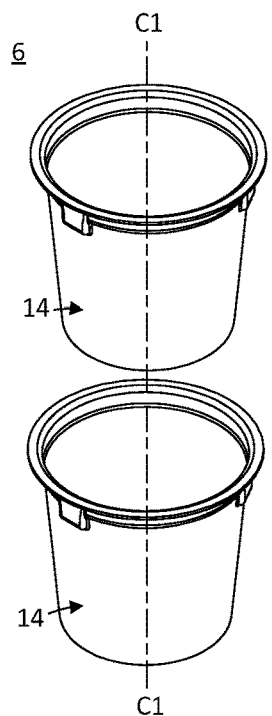
FIG. 3d, depicts two of the paper-made container, as depicted in FIG. 3c, which are one-by-one nested, in an alignment, into a stack assembly.
Figure 3E:
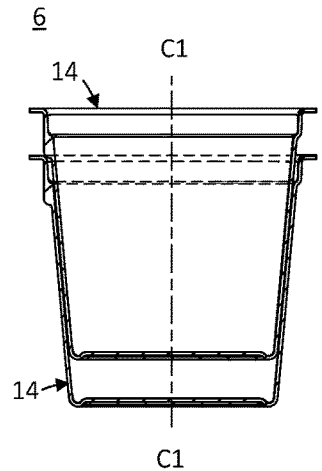
FIG. 3e, depicts a transversally sectional view of the two nested paper-made containers in FIG. 3d.

Please refer to the illustrations as shown in FIGS. 3a, 3b & 3c, which depict a carrier 1 of a third preferred embodiment according to the present invention. The third preferred embodiment has differences, from the aforementioned first preferred embodiment, that: in the third preferred embodiment, a filter 12 of a carrier 1 and an isolating layer 30 of the paper-made container 14 all are formed without the convex-surface structures 142, 342 of the aforementioned first preferred embodiment as depicted in FIG. 1a, and at least one protrusive portion 242 of said paper-made container 14 of the third preferred embodiment comprises only a number of separated lateral protrusions 244, but inner circumferential surface of said paper-made container 14 is formed thereon without a number of pits 246, corresponding to lateral protrusion 244, of first preferred embodiment as depicted in FIG. 1a. Besides, please refer to the illustrations as shown in FIGS. 3d & 3e. FIG. 3d depicts two of paper-made containers 14 shown in FIG. 3c are one-by-one nested, in an alignment, into a stack assembly 6 thereof through collinearity of the central axes C1 of both thereof, and FIG. 3e depicts a transversally sectional view of the two nested paper-made containers 14 as depicted in FIG. 3d. As to the other structures of said carrier 1 of the third preferred embodiment, its related function, fabricating and assembling process all are the same as the first preferred embodiment, and therefore its descriptions will be omitted hereinafter.

Figure 4A:
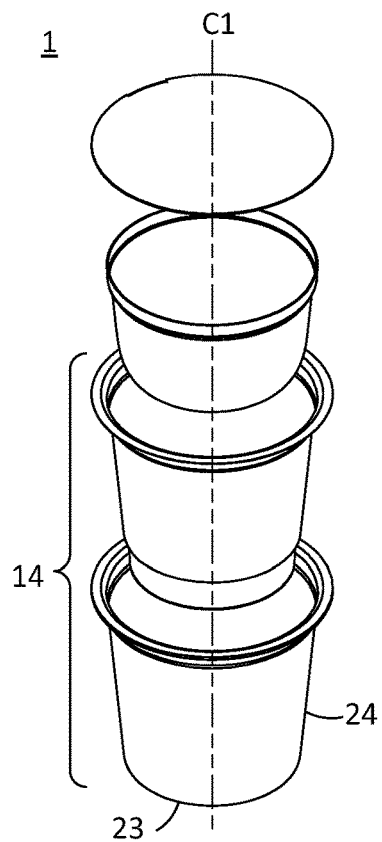
FIG. 4a, depicts a perspective component-exploded diagram of carrier, used for preparing beverage, according to a forth preferred embodiment of the present invention.
Figure 4B:
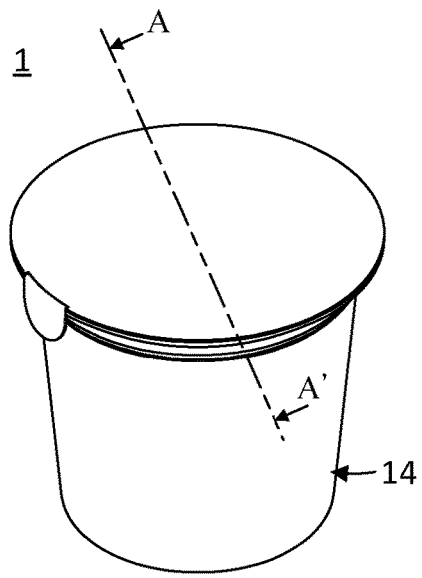
Figure 4C:
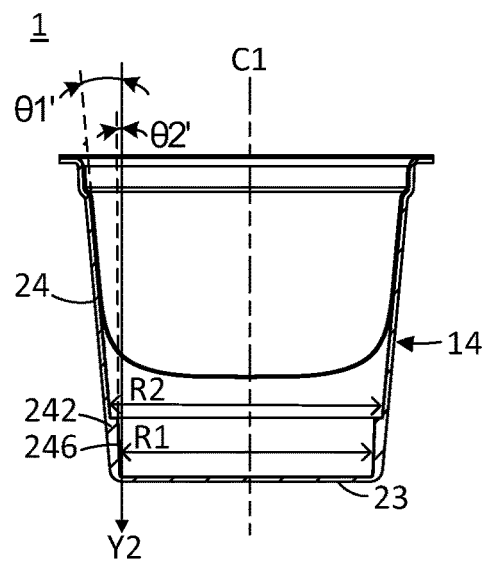
FIG. 4c, depicts a transversally sectional view according to a sectioning line A-A' on the carrier as depicted in FIG. 4b.
Figure 4D:
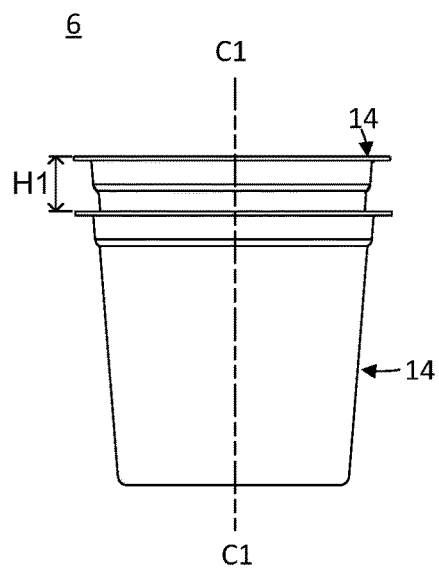
FIG. 4d, depicts two of the paper-made container, as depicted in FIG. 4c, which are one-by-one nested, in an alignment, into a stack assembly.
Figure 4E:
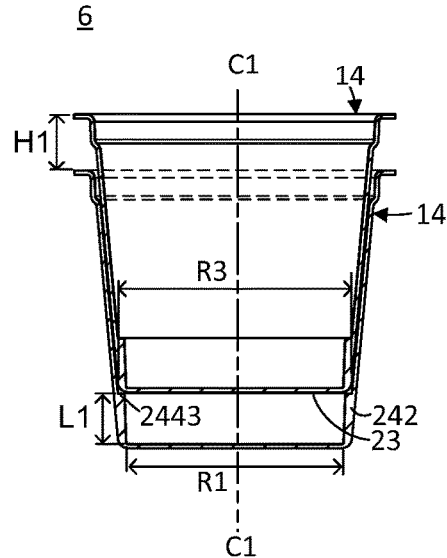
FIG. 4e, depicts a transversally sectional view of the two nested paper-made containers shown in FIG. 4.

Please refer to the illustrations shown in FIGS. 4a, 4b & 4c, which depict a carrier 1 according to a forth preferred embodiment of the present invention. From the aforementioned third preferred embodiment, the forth preferred embodiment has differences that: in the forth preferred embodiment, after said paper-made container 14 of the carrier 1 is compression-formed, said paper-made container 14 is demolded, along said demolding direction Y2, to expedite said annular cup wall 24 being inwardly, laterally formed with at least one protrusive portion 242 (as shown in FIG. 4e), and said at least one protrusive portion 242 is an annular structure formed around a lower half portion of an inner circumferential surface of said annular cup wall 24 of said paper-made container 14 (at a location near cup bottom portion 23), and extended toward the central axis C1 of said carrier 1, thereby making a diameter R1 of an inner circumference of said annular structure of said at least one protrusive portion 242 being smaller than a diameter R2 of an inner circumference of the annular cup wall 24 of the paper-made container 14 (its entirety is near to a location at upper of said annular structure of said at least one protrusive portion 242), and an innermost surface 246 of said at least one protrusive portion 242 is an evenly-flatted plane, instead of forming a structural design in the existing undercut technology. In this preferred embodiment, while said inner circumferential surface of said annular cup wall 24 is formed with a positive draft angle θ1' relative to demolding direction Y2, said innermost surface 246 of said at least one protrusive portion 242 is formed with a positive draft angle θ2' relative to said demolding direction Y2, wherein θ1'>θ2'≥0° or θ1'≥θ2'>0°. Please further refer to the illustrations as shown in FIGS. 4d & 4e where during two of said paper-made containers 14 are up-and-down nested to constitute a stack assembly 6, by such a way that a diameter R1 of inner circumference of said annular structure of said at least one protrusive portion 242 of said paper-made container 14 at a lower is smaller than a diameter R3 of an outer circumference of said cup bottom portion 23 of said paper-made container 14 at an upper, it expedites that a stopping end portion 2443 on said at least one protrusive portion 242 of said lower paper-made container 14 upwardly stops the cup bottom portion 23 of said upper paper-made container 14 continuing to enter inside said lower paper-made container 14, and simultaneously it expedites that a position limit between the two nested paper-made containers 14 is limited to specific height L1 of said at least one protrusive portion 242 of said lower paper-made container 14, so as to retain a longitudinal position-limiting interval H1 (H1≥L1) between the two nested paper-made containers 14, thereby ensuring that while said respective paper-made container 14 passes through component-picking of the automatically component-picking equipment of the component-assembling production line, said respective paper-made container 14 is sequentially one-by-one drawn out from said two aligned paper-made containers 14 of the stack assembly 6, to benefit implementing of an assembly of respective corresponding components for said respective paper-made container 14. In this preferred embodiment, by way of stopping and position limiting of said at least one protrusive portion 242 located between said each two nested paper-made containers 14, it can ensure that central axes C1 of said each two nested paper-made containers 14 are collinear, and said position-limiting interval H1 is extended in a direction paralleling with the central axis C1 of said respective paper-made container 14, so as to raise a firmed and non-leaned manner of nesting between all the paper-made containers 14 in the stack assembly 6, thereby assisting that the automatically component-picking equipment of the component-assembling production line accurately sequentially one-by-one picks component from said nested paper-made containers 14 in alignment of the stack assembly 6. By way of stopping and position limiting of said annular structure of said at least one protrusive portion 242 located between the two nested paper-made containers 14, it can expedite that a respective nested depth and fitting scale among said number of nested paper-made containers 14 in alignment is completely consistent with each other, and a firmed and non-leaned manner of the nesting is raised. As to the other structures of said carrier 1 of the forth preferred embodiment, its related function, fabricating and assembling process all are the same as the third preferred embodiment, and therefore its descriptions will be omitted hereinafter.

Figure 5A:
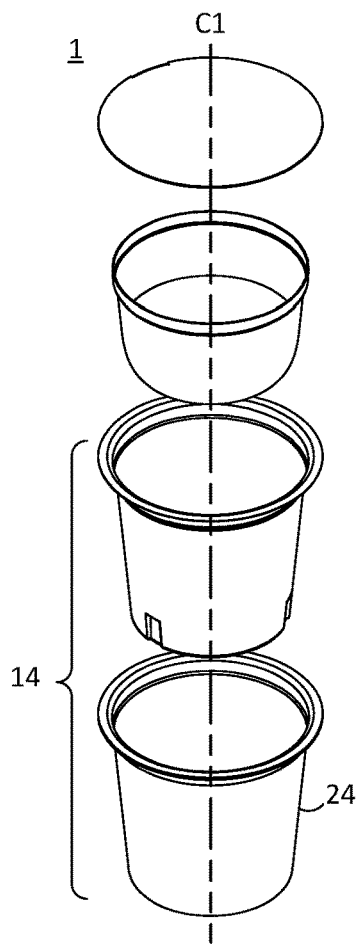
FIG. 5a, depicts a perspective component-exploded diagram of carrier, used for preparing beverage, according to a fifth preferred embodiment of the present invention.
Figure 5B:
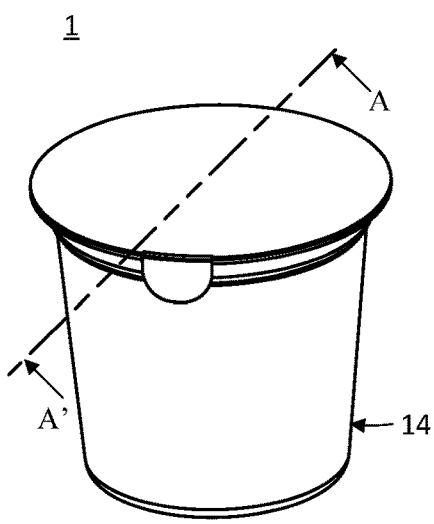
Figure 5C:
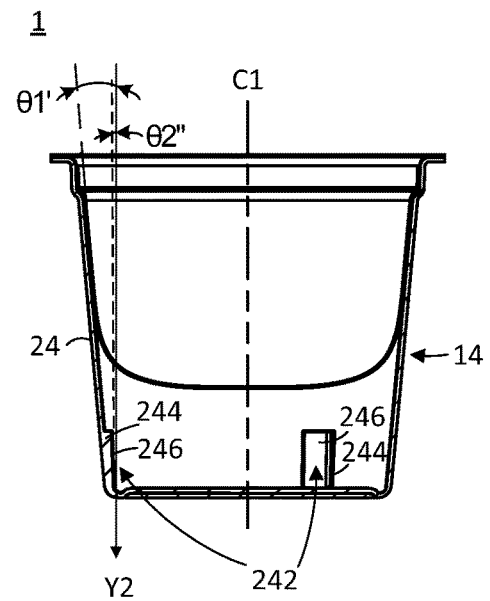
FIG. 5c, depicts a transversally sectional view according to a sectioning line A-A' on the carrier as depicted in FIG. 5b.
Figure 5D:
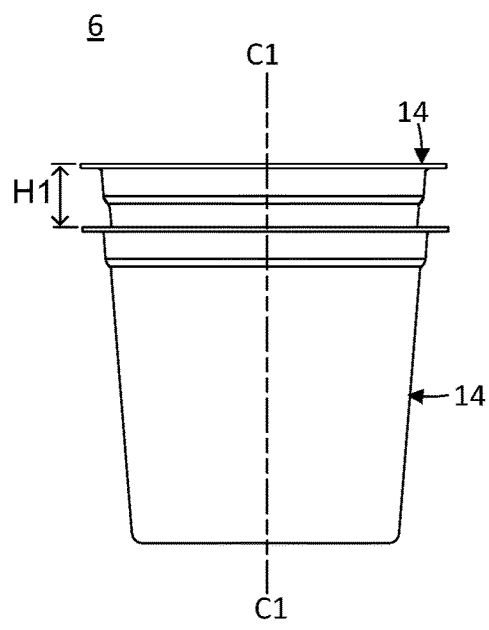
FIG. 5d, depicts two of the paper-made container, as depicted in FIG. 5c, which are one-by-one nested, in an alignment, into a stack assembly.
Figure 5E:
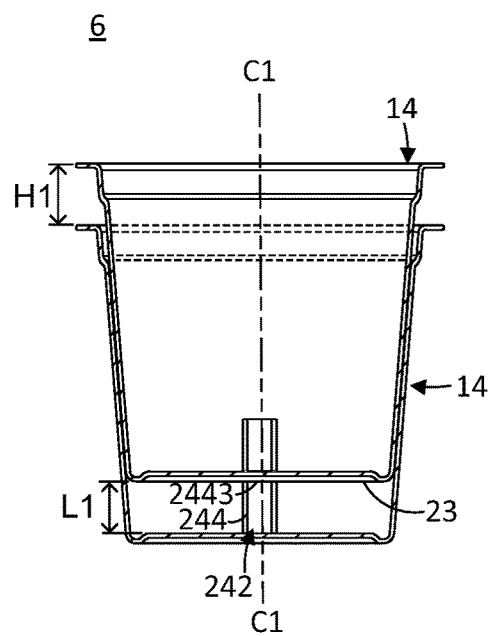
FIG. 5e, depicts a transversally sectional view of the two nested paper-made containers shown in FIG. 5d.

Please refer to the illustrations as shown in FIGS. 5a, 5b & 5c, which depict a carrier 1 of a fifth preferred embodiment according to the present invention. From the aforementioned forth preferred embodiment, the fifth preferred embodiment has differences that: in the fifth preferred embodiment 1, at least one protrusive portion 242 of carrier 1 comprises a number of separated lateral protrusions 244 which are distributed along a lower half portion of an inner circumferential surface of said annular cup wall 24 of the paper-made container 14), and an innermost surface 246 of said respective lateral protrusion 244 is an evenly-flatted plane. In this preferred embodiment, while said inner circumferential surface of said annular cup wall 24 is formed with a positive draft angle θ1' relative to demolding direction Y2, said innermost surface 246 of said respective lateral protrusion 244 is formed with a positive draft angle θ2" relative to said demolding direction Y2, wherein θ1'>θ2"≥0° or θ1'≥θ2">0°. Please further refer to the illustrations as shown in FIGS. 5d & 5e. During two of said paper-made containers 14 are up-and-down nested to constitute a stack assembly 6, stopping end portions 2443 on said number of separated lateral protrusions 244 of said at least one protrusive portion 242 of said paper-made container 14 at a lower upwardly stop the cup bottom portion 23 of said paper-made container 14 at an upper continuing to enter inside said lower paper-made container 14, simultaneously it expedites that position limit between the two nested paper-made containers 14 is limited to a specific height L1 of said respective lateral protrusion 244 of said lower paper-made container 14, so as to retain a longitudinal position-limiting interval H1 (H1≥L1) between the two nested paper-made containers 14, thereby ensuring that while said respective paper-made container 14 passes through component-picking of the automatically component-picking equipment of the component-assembling production line, said respective paper-made container 14 is sequentially one-by-one drawn out from said two aligned paper-made containers 14 of the stack assembly 6, to benefit implementing an assembly of respective corresponding components for said respective paper-made container 14. In this preferred embodiment, by way of stopping and position limiting of said respective lateral protrusion 244 located between said each two nested paper-made containers 14, it can ensure that central axes C1 of said each two nested paper-made containers 14 are collinear, and said position-limiting interval H1 is extended in a direction paralleling with the central axis C1 of said respective paper-made container 14, so as to raise a firmed and non-leaned manner of nesting between all the paper-made containers 14 in the stack assembly 6, and it can assist the automatically component-picking equipment of the component-assembling production line accurately sequentially one-by-one picking component from said nested paper-made containers 14 in alignment. By way of stopping and position limiting of said number of lateral protrusion 244 of said at least one protrusive portion 242 located between the two nested paper-made containers 14, it can expedite that a respective nested depth and fitting scale in said number of nested paper-made containers 14 in alignment is completely consistent with each other, and a firmed and non-leaned manner of the nesting is raised. As to the other structures of said carrier 1 of the fifth preferred embodiment, its related function, fabricating and assembling process all are the same as the forth preferred embodiment, and therefore its descriptions will be omitted hereinafter.

Besides, please refer to an illustration in FIG. 6, which depicts a step flowchart of a method, for fabrication of a carrier used for preparing beverage, according to a preferred embodiment of the present invention. In the present invention, the respective components structure and its component function of the carrier mentioned in the respective steps of said method for fabrication of a carrier used for preparing beverage all are collocated in the descriptions of the respective aforementioned embodiments as depicted in FIGS. 1a~5e & 7, and its repeated descriptions will be omitted hereinafter. Said method for fabrication of a carrier used for preparing beverage comprises the following steps that:

in step S1, by consistently-and-automatically fabricating machines 7 of wet-fiber paper-molding process as depicted in FIG. 7, massively fabricating a number of paper-made containers 14, said step S1 further comprises that:

in step S1A, firstly using a couple of mold assembly 72, 74 of said pulp-dredging and pre-compression equipment 70 of consistently-and-automatically fabricating machines 7 as depicted in FIG. 7, to collectively dredge slurry material body 66 consisting of wet plant fibers, from within a slurry tank 76 storing slurry 78, and to pre-compress the slurry material body 66 into a wet blank, and then using another couple of mold assembly 82, 84 of said thermo-compression forming equipment 80 for paper-molded article, to further perform a thermo-compression forming on the pre-compressed slurry material body 66, thereby integrally forming an entire solid geometric shape of said respective paper-made substrate 20 (substantially the same as an entire solid geometric shape of said paper-made container 14). Said respective paper-made substrate 20 comprises a cup top portion 22 having a first opening 223, a cup bottom portion 23, and a annular cup wall 24 standing in extension between said cup top portion 22 and said cup bottom portion 23, and said paper-made substrate 20 of said respective paper-made container 14 is demolded along demolding directions Y1, Y2 corresponding to said mold assembly 82, 84, thereby making said annular cup wall 24 laterally forming at least one protrusive portion 242 (as depicted in FIGS. 1e & 4e) and said demolding directions Y1, Y2 paralleling with a central axis of said annular cup wall C1; and in step S1B, next by way of automatically atomization-spraying of said surface coating equipment 90 for paper-molded article, in the consistently-and-automatically fabricating machines 7 as depicted in FIG. 7, forming an isolating layer 30 onto the entire inner surface of said respective paper-made substrate 20, thereby fabricating the respective corresponding paper-made container 14; in an embodiment, said waterproof material is polylactide (PLA). It should be noted that, said consistently-and-automatically fabricating machines 7 of the wet-fiber paper-molding process, depicted in FIG. 7, can be further referred to the introduction of the Chinese utility model patent application number CN201820101475.3; however, it is just one of the illustrations of consistently-and-automatically fabricating machines of the wet-fiber paper-molding process which are adopted by a fabricating method of the present invention, and therefore is not restricted to necessarily use said consistently-and-automatically fabricating machines 7 of the wet-fiber paper-molding process, as depicted in FIG. 7. That is because in other embodiment, any one capable of accomplishing integrally forming of said solid geometric shape of said paper-made substrate 20 of the present invention and automatically massive fabrication of consistently-and-automatically fabricating machines of the wet-fiber paper-molding process all can be adopted;

in step S2, one-by-one nesting said number of paper-made containers 14, in an alignment, into a stack assembly 6, wherein by way of stopping and position limiting of said at least one protrusive portion 242 located between each two nested ones of said paper-made containers 14, it facilitates a longitudinally position-limiting interval H1 being retained between the each two nested paper-made containers 14; in a preferred embodiment, said step S2 further comprises that: by way of stopping and position limiting of said at least one protrusive portion 242 located between the each two nested paper-made containers 14, it is used for ensuring that the central axes C1 of the each two nested paper-made containers 14 are collinear, and said position-limiting interval H1 is extended in a direction paralleling with the central axes C1 of said respective nested paper-made containers 14;

in step S3, while said respective paper-made container 14 passes through a component-picking of the automatically component-picking equipment of the component-assembling production line, sequentially one-by-one drawing out said respective paper-made container 14, by said longitudinally position-limiting interval H1, from said number of aligned paper-made containers 14 of said stack assembly 6, thereby making said respective paper-made container 14 being sequentially one-by-one equipping with a corresponding filter 12 which partitions inside said paper-made container 14 into a first carrying space 126 and a second carrying space 128, wherein said filter 12 is suspended on an upper half portion of said inner circumferential surface of said annular cup wall 24 of said paper-made container 14 and enclosing said beverage medium 3; in a preferred embodiment, said step S3 further comprises: using an ultrasonic-wave processing to hot-melt a thermoplastic polymer object (e.g. extra adhesive or any kind of component itself). In a case of polylactide (PLA), silicone or natural latex, said filter 12 is adhered onto an inner circumferential surface of said annular cup wall 24 of said corresponding paper-made container 14;

in step S4, filling a medium of said beverage 3 (e.g. said beverage medium 3 comprises but is not restricted to, one of coffee bean grounds, teas, dried plants or fruits, concentrated or extracted substance) within said first carrying space 126 of said respective paper-made container 14, thereby making an upper surface of said filter 12 carrying said beverage medium 3, wherein said filter 12 is suspended on the upper half portion of said inner circumferential surface of said annular cup wall 24 of said paper-made container 14 and enclosing said beverage medium 3, so as to benefit the followings that said filter 12 drip-filtrates said beverage fluid to flow from the first carrying space 126 toward within said second carrying space 128; and, step S5, making a bottom plane 104 of a sealing lid 10 firmly adhering onto an annular surface 221 of said cup top portion 22 of said corresponding paper-made container 14, to watertightly seal said first opening 223 and said first carrying space 126 of said respective paper-made container 14, thereby preserving said corresponding filter 12 inside said paper-made container 14, for constituting said respective corresponding carrier 1. In an embodiment, it applies said same ultrasonic-wave processing to hot-melt thermoplastic polymer object in said step S3 (e.g. extra adhesive or any kind of component itself). In a case of polylactide (PLA), silicone or natural latex, said bottom plane 104 of said sealing lid 10 is firmly adhered onto said annular surface 221 of said cup top portion 22 of said corresponding paper-made container 14.

In a preferred embodiment, said step S2 further comprises: by said longitudinally position-limiting interval H1, making a clearance fit being formed, with a minimum transverse clearance larger than zero value G1, between said annular cup walls 24 of the each two nested paper-made containers 14, and said step S3 further comprises: utilizing said clearance fit to ensure that whiles said respective paper-made container 14 passes through component-picking of the automatically component-picking equipment of the component-assembling production line, said respective paper-made container 14 is sequentially one-by-one drawn out from said number of aligned paper-made containers 14 of from said stack assembly 6, thereby sequentially one-by-one equipping said respective paper-made container 14 with said corresponding filter 12.

In a preferred embodiment, said step S4 further comprises: filling an inert gas (e.g. nitrogen gas, carbon dioxide and so on one or mixing of) within said respective paper-made container 14, and said step S5 further comprises: by said bottom plane 104 of said sealing lid 10 firmly adhering onto a said annular surface 221 of said cup top portion 22 of said corresponding paper-made container 14, airtightly preserving the inert gas stored within said respective paper-made container 14.

In conclusion, in the present invention, an entire solid geometric shape of said paper-made container 14 is integrally formed in conformity with FDA food grade registration certificate by way of compression forming of mold assembly of wet-fiber paper-molding process, and satisfies the environmental protection requirements for biodegradability and biocompostability, and said paper-made substrate 20 of said paper-made container 14 is demolded along demolding directions Y1 or Y2 corresponding to said mold assembly 82 or 84, thereby making said annular cup wall 24 of said paper-made container 14 laterally forming at least one protrusive portion 242 and said demolding directions Y1, Y2 paralleling with a central axis C1 of said annular cup wall 24, to avoid usage of the existing undercut-design structure which complicates a constitution and its fabricating process of mold assembly, and by said at least one protrusive portion 242, it expedites that a longitudinally position-limiting interval H1 is retained, between each two nested ones of said paper-made containers 14, acting as stopping and position limiting for a nested depth between the each two nested paper-made container 14, to ensure that while said respective paper-made container 14 passes through a component-picking of the automatically component-picking equipment of the component-assembling production line, said respective paper-made container 14 can be accurately sequentially one-by-one drawn out, so as to raise workability and compatibility upon said paper-made container passing through assembling of the component-assembling production line, thereby raising fabricating efficiency of said carrier, and by said longitudinally position-limiting interval H1, its expedites that a clearance fit is formed, with a minimum transverse clearance larger than zero value G1, between annular cup walls 24 of the each two nested paper-made containers 14, to ensure that the automatically component-picking equipment of the component-assembling production line can apply the same working force suitable for one-by-one accurately drawing out said respective paper-made containers 14, thereby eliminating occurrence of the wastes.

The foregoing contexts just collocates descriptions of drawings corresponding to concretely embodying matters of the present invention, rather than restriction for protective scope of the present invention, it should be realized for skilled persons that pertain to the field, that on a basis of technical solutions of the present invention, a variety of modifications or variation that are directly made, without implementation of creative work, by the skilled persons that pertain to the field, are still within protective scope of the present invention.

What is claimed is:

1. A carrier used for preparing beverage, comprising:
   a paper-made container, comprising a cup top portion having a first opening, a cup bottom portion, an annular cup wall standing in extension between said cup bottom portion and said cup top portion, and an isolating layer formed over an entire inner surface of said paper-made container;
   a filter, assembled inside said paper-made container to partition said paper-made container into a first carrying space that is defined between an upper surface of said filter and said cup top portion, for storage of medium corresponding to said beverage, and a second carrying space that is defined between a bottom surface of said filter and said cup bottom portion, for storage of a fluid of said beverage generated by action of said beverage medium; and
   sealing lid, having a bottom plane acting on firm adhesion onto an annular surface of said cup top portion, to watertightly seal said first opening and said first carrying space of said paper-made container in a way of preserving said filter inside said paper-made container;
   wherein a solid geometric shape of said paper-made container is integrally formed by way of compression forming of a mold assembly of wet-fiber paper-molding process, and by way of demolding of said paper-made container along a demolding direction corresponding to said mold assembly, said annular cup wall is laterally formed with at least one protrusive portion and said demolding direction parallels to a longitudinally central axis of said annular cup wall, wherein said at least one protrusive portion is formed alongside a lower half portion of an inner circumferential surface of the annular cup wall, and is extended transversely and inwardly, toward the longitudinally central axis, from the lower half portion of the inner circumferential surface of the annular cup wall, to terminally form an innermost surface, thereby ensuring that said respective paper-made container is sequentially one-by-one assembled to constitute said respective corresponding carrier while said respective paper-made container passes through component-assembling production line.

2. The carrier used for preparing beverage as claimed in claim 1, wherein said paper-made container, said isolating layer, said filter, and said sealing lid all belong to food-contacting material in conformity with FDA food grade registration certificate.

3. The carrier used for preparing beverage as claimed in claim 1, wherein said paper-made container conforms with biodegradability and biocompostability standards of U.S. ASTM D6868.

4. The carrier used for preparing beverage as claimed in claim 1, wherein said paper-made container is made of bagasse.

5. The carrier used for preparing beverage as claimed in claim 1, wherein said paper-made container is made of bagasse and bamboo fibers.

6. The carrier used for preparing beverage as claimed in claim 1, wherein said paper-made container is made of bagasse and eucalyptus fibers.

7. The carrier used for preparing beverage as claimed in claim 1, wherein said paper-made container is made of bagasse and southern yellow pine fibers.

8. The carrier used for preparing beverage as claimed in claim 1, wherein said isolating layer is formed with water-proof material which is polylactide and is coated onto said inner surface of said paper-made container.

9. The carrier used for preparing beverage as claimed in claim 1, wherein said at least one protrusive portion comprises a number of separated lateral protrusions.

10. The carrier used for preparing beverage as claimed in claim 9, wherein said number of separated lateral protrusions are distributed over the lower half portion of the inner circumferential surface of said annular cup wall, and an innermost surface of said lateral protrusion is a completely evenly-flatted plane.

11. The carrier used for preparing beverage as claimed in claim 10, wherein a draft angle of said inner circumferential surface of said annular cup wall is $\theta1'$, a draft angle of said innermost surface of said respective lateral protrusion is $\theta2''$, wherein $\theta1' > \theta2'' \geq 0°$ or $\theta1' \geq \theta2'' > 0°$.

12. The carrier used for preparing beverage as claimed in claim 1, wherein a draft angle of said inner circumferential surface of said annular cup wall is $\theta1'$, a draft angle of said innermost surface of said at least one protrusive portion is $\theta2'$, wherein $\theta1'>\theta2'\geq0°$ or $\theta1'\geq\theta2'>0°$.

13. The carrier used for preparing beverage as claimed in claim 1, wherein an annular top portion of said filter is formed with a second opening corresponding to a location where said first opening is located, a lateral rim of said annular top portion is joined onto an upper half portion of an inner circumferential surface of said annular cup wall, and said sealing lid is configured to watertightly seal said second opening of said filter.

14. The carrier used for preparing beverage as claimed in claim 1, wherein said filter is a filtration pack having a porous sieve.

15. The carrier used for preparing beverage as claimed in claim 1, wherein after said carrier is loaded inside a beverage brewing machine, an injecting needle tube of said beverage brewing machine pierces through said sealing lid to reach within said first carrying space and a draining needle tube of said beverage brewing machine pierces through said cup bottom portion to reach within said second carrying space, such that by said injecting needle tube pouring water to mutually act on said medium of said first carrying space, said beverage fluid is generated to flow from said first carrying space toward said second carrying space through filtration of said filter, and to drain outside said beverage brewing machine through said draining needle tube.

16. A stack assembly, comprising a number of said paper-made containers of said carriers as claimed in claim 1, which are one-by-one nested in alignment, and wherein by way of stopping and position limiting of said at least one protrusive portion between each two nested ones of said paper-made containers, a longitudinally position-limiting interval is retained between the each two nested paper-made containers, to ensure that said respective paper-made container is sequentially one-by-one drawn out, from said number of aligned paper-made containers, to implement assembling of said respective paper-made container, while said respective paper-made container passes through said component-assembling production line.

17. The stack assembly as claimed in claim 16, wherein by way of stopping and position limiting of said at least one protrusive portion between the each two nested paper-made containers, it is ensured that central axes of the each two nested paper-made containers are collinear, and said position-limiting interval is extended in a direction paralleling with the central axes of said respective paper-made containers.

18. The stack assembly as claimed in claim 16, wherein said longitudinally position-limiting interval makes a clearance fit being formed, with a minimum transverse clearance larger than zero value, between said annular cup walls of the each two nested paper-made containers, said clearance fit is configured to ensure that said respective paper-made container is sequentially one-by-one drawn out, from said number of aligned paper-made containers, to implement assembling of said respective paper-made container, while said respective paper-made container passes through said component-assembling production line.

19. The stack assembly as claimed in claim 18, wherein while said longitudinal position-limiting interval is a constant, said minimum transverse clearance between said annular cup walls of the each two nested paper-made containers is inversely proportional to a transversally cross-sectional thickness of said annular cup wall.

20. The stack assembly as claimed in claim 18, wherein while the transversally cross-sectional thickness of said annular cup wall of said respective paper-made container is a constant, said minimum transverse clearance between said annular cup walls of the each two nested paper-made containers is directly proportional to said longitudinal position-limiting interval.

21. A method for fabrication of a carrier used for preparing beverage, comprising the following steps of:
   step S1, massively fabricating a number of paper-made containers, and further comprising:
      step S1A, by way of compression forming of a mold assembly of wet-fiber paper-molding process, integrally forming a solid geometric shape of a respective paper-made substrate which comprises a cup top portion having a first opening, a cup bottom portion, and an annular cup wall standing in extension between said cup bottom portion and said cup top portion, and by way of demolding of said respective paper-made substrate along a demolding direction corresponding to said mold assembly, making said annular cup wall being laterally formed with at least one protrusive portion and said demolding direction paralleling with a central axis of said annular cup wall, wherein said at least one protrusive portion is formed alongside a lower half portion of an inner circumferential surface of the annular cup wall, and is extended transversely and inwardly, toward the longitudinally central axis, from the lower half portion of the inner circumferential surface of the annular cup wall, to terminally form an innermost surface; and
      step S1B, forming an isolating layer over an entire inner surface of said respective paper-made substrate, thereby fabricating the respective corresponding paper-made container;
   step S2, one-by-one nesting said number of paper-made containers, in an alignment, into a stack assembly, wherein by way of stopping and position limiting of said at least one protrusive portion between each two nested ones of said paper-made containers, a longitudinally position-limiting interval is retained between the each two nested paper-made containers;
   step S3, with said longitudinally position-limiting interval, sequentially one-by-one drawing out said respective paper-made container from said number of aligned paper-made containers of said stack assembly while said respective paper-made container passes through component-picking of a component-assembling production line, thereby sequentially one-by-one equipping said respective paper-made container with a corresponding filter which partitions inside said paper-made container into a first carrying space and a second carrying space;
   step S4, filling medium of said beverage within said first carrying space of said respective paper-made container, to make an upper surface of said filter carrying said beverage medium; and,
   step S5, making a bottom plane of a sealing lid firmly adhering onto an annular surface of a cup top portion of said corresponding paper-made container, to watertightly seal said first opening and said first carrying space of said respective paper-made container, and to preserve said corresponding filter and said carried beverage medium inside said paper-made container, for constituting said respective corresponding carrier.

22. The method for fabrication of a carrier used for preparing beverage as claimed in claim 21, wherein said step S1B further comprises: forming said isolating layer by coating waterproof material, which is polylactide, onto said inner surface of said paper-made container.

23. The method for fabrication of a carrier used for preparing beverage as claimed in claim 21, wherein said step S2 further comprises: by said longitudinally position-limiting interval, forming a clearance fit, with a minimum transverse clearance larger than zero value, between said annular cup walls of the each two nested paper-made containers, and said step S3 further comprises: utilizing said clearance fit to ensure that said respective paper-made container is sequentially one-by-one drawn out from said number of aligned paper-made containers of said stack assembly while said respective paper-made container passes through component-picking of said component-assembling production line, thereby sequentially one-by-one equipping said respective paper-made container with said corresponding filter.

24. The method for fabrication of a carrier used for preparing beverage as claimed in claim 21, wherein said step S2 further comprises: by way of stopping and position limiting of said at least one protrusive portion between the each two nested paper-made containers, it is ensured that central axes of the each two nested paper-made containers are collinear, and said position-limiting interval is extended in a direction paralleling with the central axes of said respective paper-made containers.

25. The method for fabrication of a carrier used for preparing beverage as claimed in claim 21, wherein said step S3 further comprises: by ultrasonic-wave processing, making said corresponding filter adhering onto an inner circumferential surface of said annular cup wall of said respective paper-made container.

26. The method for fabrication of a carrier used for preparing beverage as claimed in claim 21, wherein said step S4 further comprises: filling said respective paper-made container with an inert gas, and said step S5 further comprises: by said bottom plane of said sealing lid firmly adhering onto said annular surface of said cup top portion of said corresponding paper-made container, airtightly preserving said inert gas within said respective paper-made container.

27. A carrier used for preparing beverage, comprising:
a paper-made container, comprising a cup top portion having a first opening, a cup bottom portion, an annular cup wall standing in extension between the cup bottom portion and the cup top portion, and an isolating layer formed over an entire inner surface of the paper-made container;
a filter, assembled inside the paper-made container to partition the paper-made container into a first carrying space that is defined between an upper surface of the filter and the cup top portion, for storage of medium corresponding to the beverage, and a second carrying space that is defined between a bottom surface of the filter and the cup bottom portion, for storage of a fluid of the beverage generated by action of the beverage medium; and
sealing lid, having a bottom plane acting on firm adhesion onto an annular surface of the cup top portion, to watertightly seal the first opening and the first carrying space of the paper-made container in a way of preserving said filter inside the paper-made container;
wherein a solid geometric shape of the paper-made container is integrally formed by way of compression forming of a mold assembly of wet-fiber paper-molding process, and by way of demolding of the paper-made container along a demolding direction corresponding to said mold assembly, the annular cup wall is laterally formed with at least one protrusive portion and said demolding direction parallels to a longitudinally central axis of said annular cup wall, wherein the at least one protrusive portion comprises a number of separated lateral protrusions distributed along an upper half portion, abutting underneath the cup top portion, of an outer circumferential surface of the annular cup wall, and the respective lateral protrusion is outwardly extended to protrude transversely away from the upper half portion of the outer circumferential surface of the annular cup wall, and terminally forms an outermost surface with a completely evenly-flatted plane, longitudinally extended in a specific longitudinal length from the cup top portion to terminate at a stopping end portion, by a structural relationship that the entire outer circumferential surface of the annular cup wall and the entire outermost surface of the respective lateral protrusion both are respectively formed with positive draft angles relative to said demolding direction, in a way to ensure that the respective paper-made container is sequentially one-by-one assembled to constitute the respective corresponding carrier while the respective paper-made container passes through a component-assembling production line where the paper-made container is provided in plurality, each two of which are respectively located upper and lower in an one-by-one nested alignment, to be in a manner that the stopping end portion of the respective lateral protrusion of an upper one of the each two nested paper-made containers stops over the annular surface of the cup top portion of the other lower one of the each two nested paper-made containers, to position-limit a nested depth, between the each two nested paper-made containers, in the specific longitudinal length of the outermost surface of the respective lateral protrusion, thereby retaining a longitudinal position-limiting interval between the each two nested paper-made containers, and to make the longitudinally central axes of the each two nested paper-made containers retaining a substantial collinearity.

\* \* \* \* \*